US012707107B2

(12) United States Patent
Tranvik et al.

(10) Patent No.: US 12,707,107 B2
(45) **Date of Patent: *Aug. 11, 2026**

(54) STREAMING PLATFORMS AND WEBSITES MEDIA DISCOVERY ENGINE AND RECOMMENDATION INTEGRATION SYSTEM AND METHOD

(71) Applicant: Swipefinder AB, Stockholm (SE)

(72) Inventors: Håkan Tranvik, Stockholm (SE); Michael Werner, Stockholm (SE); Carl Sjönell, Lidingö (SE); Vilhelm Landerholm, Täby (SE)

(73) Assignee: Swipefinder AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,514

(22) Filed: Feb. 19, 2025

(65) Prior Publication Data

US 2025/0373872 A1 Dec. 4, 2025

Related U.S. Application Data

(60) Provisional application No. 63/752,117, filed on Jan. 31, 2025, provisional application No. 63/652,563, filed on May 28, 2024.

(51) Int. Cl.

*H04N 21/258* (2011.01)
*G06F 3/04883* (2022.01)
*H04N 21/25* (2011.01)

(52) U.S. Cl.

CPC ... *H04N 21/25891* (2013.01); *G06F 3/04883* (2013.01); *H04N 21/252* (2013.01)

(58) Field of Classification Search

CPC ............ H04N 21/25891; H04N 21/252; G06F 3/04883

See application file for complete search history.

(56) References Cited

U.S. PATENT DOCUMENTS

| | | | | |
|---|---|---|---|---|
| 7,644,427 | B1 * | 1/2010 | Horvitz | H04N 21/4662 725/9 |
| 7,895,625 | B1 * | 2/2011 | Bryan | H04N 21/4788 725/86 |
| 11,350,170 | B1 * | 5/2022 | Arazi | H04N 21/4665 |

(Continued)

FOREIGN PATENT DOCUMENTS

WO 2022199494 A1 9/2022

OTHER PUBLICATIONS

European Patent Office, Search Report and Written Opinion for International Application No. PCT/EP2025/063207, Date of Mailing Jul. 3, 2025, 63 pages.

*Primary Examiner* — Nathan J Flynn
*Assistant Examiner* — Christine A Kurien
(74) *Attorney, Agent, or Firm* — Dickinson Wright PLLC

(57) ABSTRACT

A method for integrating streaming platforms, website search engines, and social media is disclosed. The method may include a computer system sending a particular content recommendation to a user's device. The computer system may receive information corresponding to the user's decision regarding their interest in the particular content recommendation, and may determine a different content recommendation using a history of the user's decisions regarding other content recommendations. The computer system may then send the different content recommendation to the user's device.

17 Claims, 16 Drawing Sheets

(56) References Cited

U.S. PATENT DOCUMENTS

| | | | | |
|---|---|---|---|---|
| 2013/0263168 | A1* | 10/2013 | Choi | H04N 21/252<br>725/14 |
| 2019/0158443 | A1* | 5/2019 | Liao | H04L 41/0896 |
| 2022/0083147 | A1* | 3/2022 | de Paz | H04N 21/462 |

* cited by examiner

Group Information 411

Computer System 401

Group Information 412

Sensitive Material 415

Authorization Request 416

Content Recommendations 413

Content Recommendations 414

Network 402

Activation Request 407

Activation Request 408

Acknowledgement 417

Decisions 410

Decisions 409

405B

405A

405C

406A

406C

406B

Friend Group 403

Family Group 404

Receiving, by a computer system, an activation of a group mode from a user device associated with a user included in a friend group that includes a plurality of users
1402

Sending, by the computer system, a particular content recommendation to a respective plurality of user devices of the plurality of users
1403

Receiving, by the computer system from the respective plurality of user devices, data indicative of a plurality of respective user decisions from the plurality of users regarding the particular content recommendation
1404

Determining, by the computer system, a different content recommendation using the plurality of respective user decisions from the plurality of users
1405

Sending, by the computer system, the different content recommendation to the respective plurality of user devices
1406

End
1407

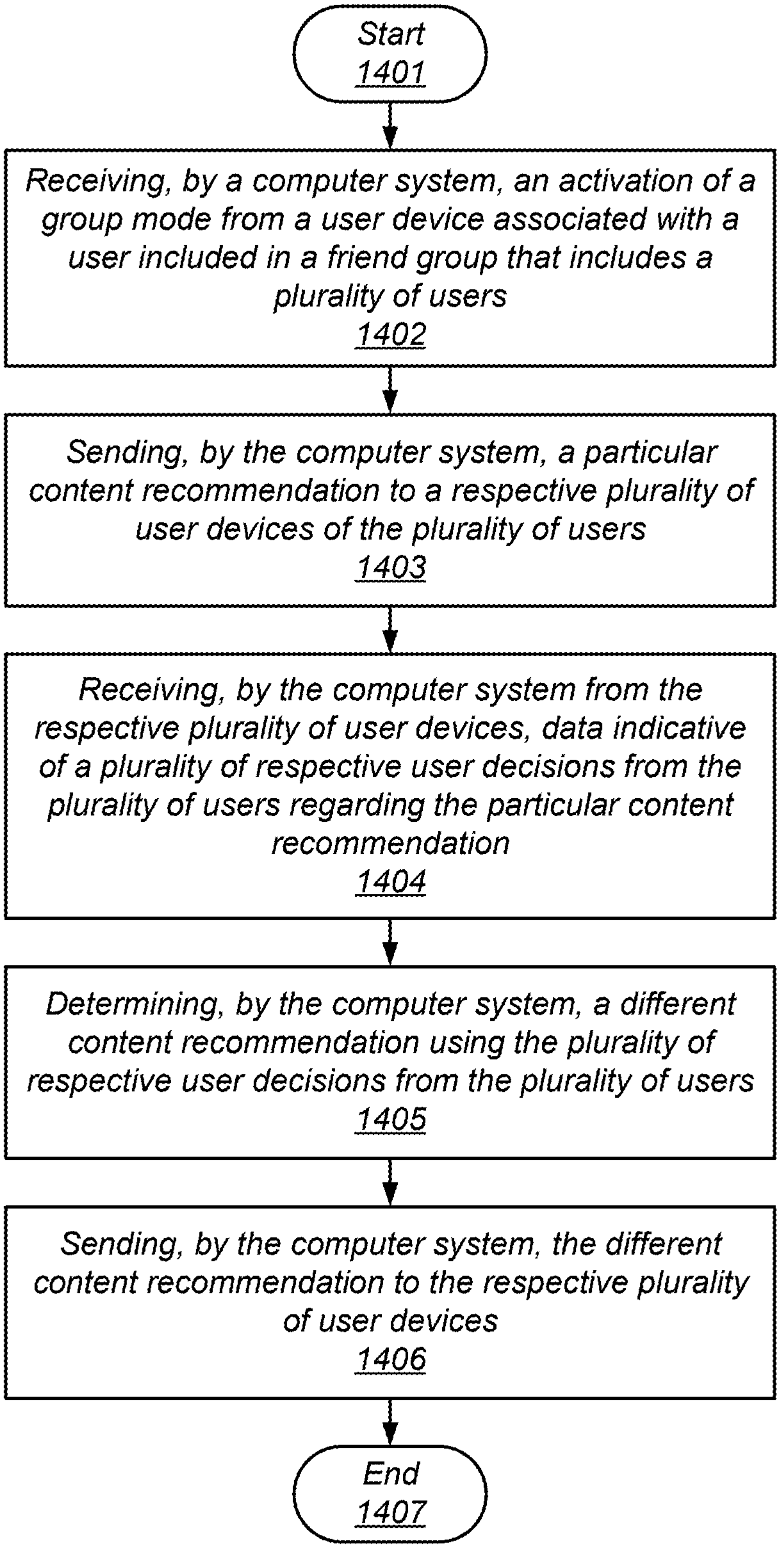

FIG. 14

Receiving, by a computer system, an activation of a group mode from a user device associated with a user included in a family group that includes a plurality of users
1502

Sending, by the computer system, a particular content recommendation to a respective plurality of user devices of the plurality of users
1503

Receiving, by the computer system from the respective plurality of user devices, data indicative of a plurality of user decisions from the plurality of users regarding the particular content recommendation
1504

Determining, by the computer system, a different content recommendation using the plurality of user decisions from the plurality of users
1505

Sending, by the computer system, the different content recommendation to the respective plurality of user devices
1506

End
1507

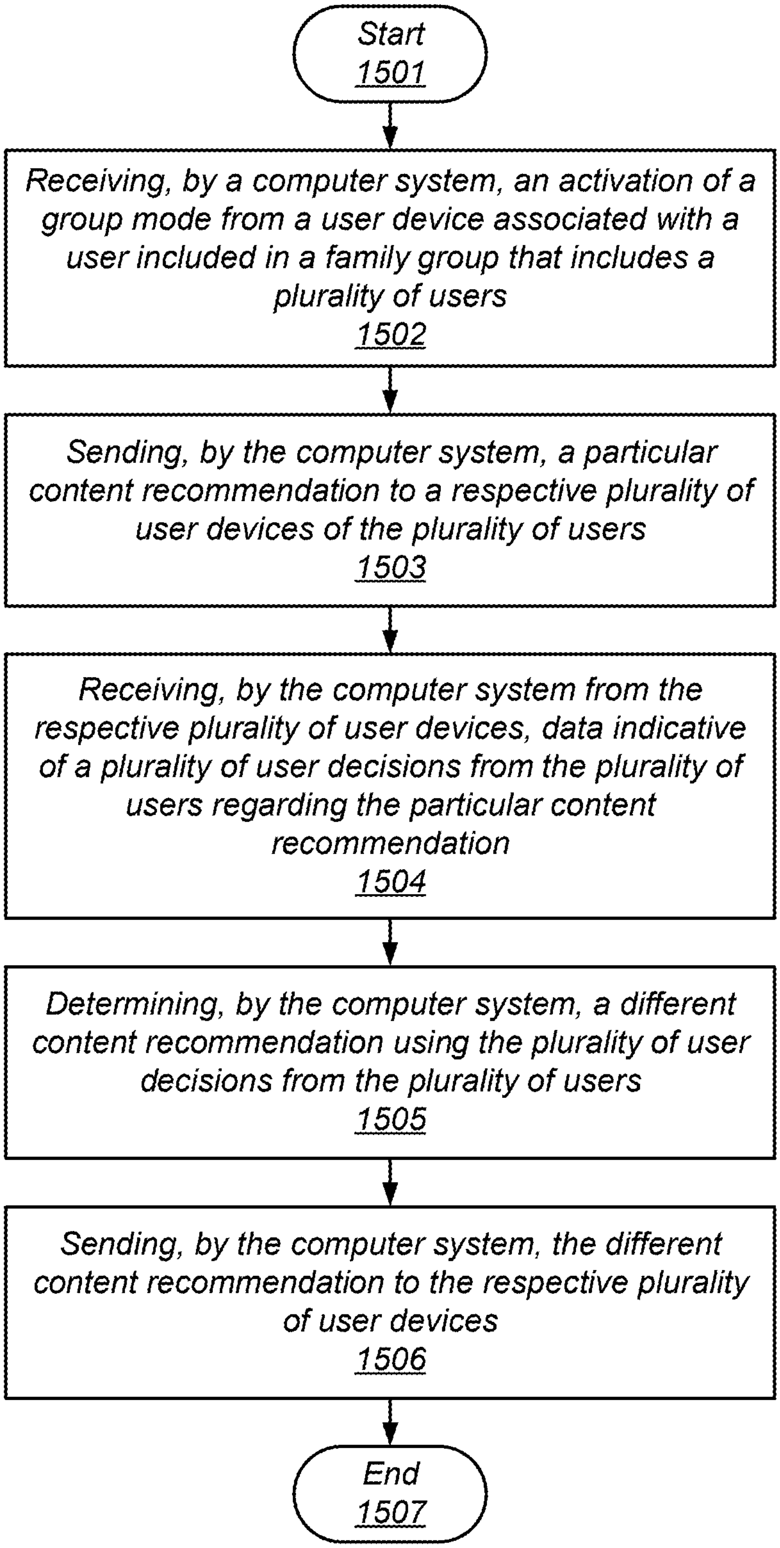

FIG. 15

Receiving, by a computer system, a user decision regarding a particular content recommendation
1602

Checking, by the computer system in response to determining the user decision is an affirmative response to the particular content recommendation, for similar content in a content database to determine a first possible content recommendation
1603

Predicting, by the computer system using the user decision, a second possible content recommendation
1604

Selecting, by the computer system from the content database, a third possible content recommendation using a weight-based selection system
1605

Determining, by the computer system, a next content recommendation using at least one of the first possible content recommendation, the second possible content recommendation, or the third possible content recommenation
1606

End
1607

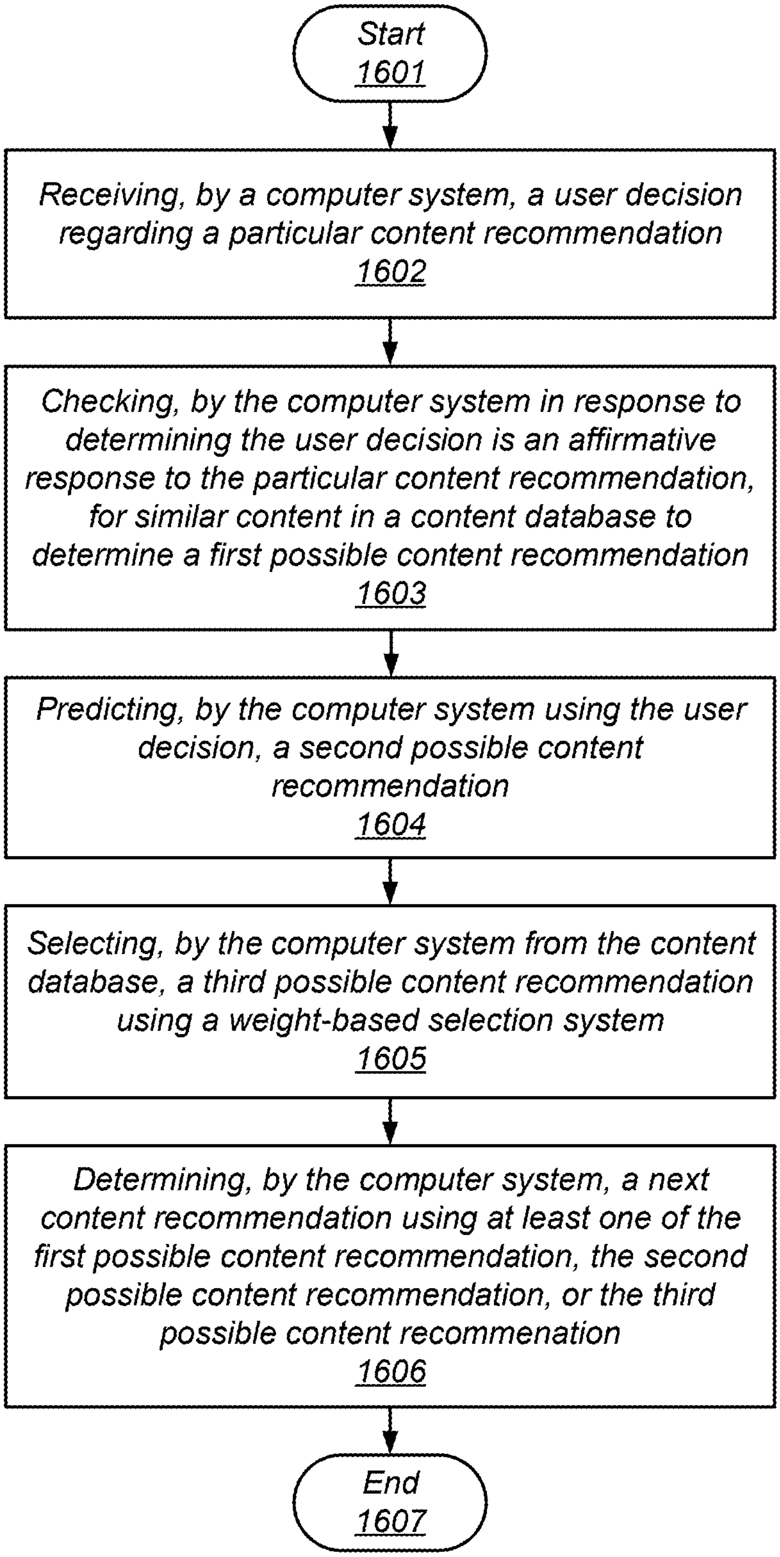

FIG. 16

STREAMING PLATFORMS AND WEBSITES MEDIA DISCOVERY ENGINE AND RECOMMENDATION INTEGRATION SYSTEM AND METHOD

CROSS-REFERENCE TO RELATED APPLICATIONS

The present application claims the benefit of U.S. Provisional Application No. 63/652,563, entitled "STREAMING PLATFORMS AND WEBSITES SEARCH ENGINE AND SOCIAL MEDIA INTEGRATION SYSTEM AND METHOD," filed May 28, 2024 and U.S. Provisional Application No. 63/752,117, of the same title, filed Jan. 31, 2025, the contents of all of which are incorporated by reference herein in their entirety for all purposes.

TECHNICAL FIELD

This disclosure relates to content delivery services and, more particularly, to integrating content delivery services with social media.

BACKGROUND

Businesses, schools, individual content creators, and the like, distribute content to subscribers using a variety of techniques. In some cases, content may be created and uploaded to a web-service provider which a subscriber can access via internet browser software. Subscriber preferences regarding interest in types of content may be tracked and stored as part of a user profile.

SUMMARY

Various embodiments of a method for integrating a recommendation system with entertainment and e-commerce platforms are disclosed. Broadly speaking, the method may include sending, by a computer system, a first content recommendation to a first user device associated with a first user, and receiving, by the computer system from the first user device, first data indicative of a user decision regarding the first content recommendation. The method may further include determining, by the computer system, a second content recommendation using a history of user decisions, and sending, by the computer system, the second content recommendation to the first user device.

In some embodiments, the first data indicative of the user decision includes information regarding a gesture made on a touchscreen included in the first user device. In other embodiments, the gesture includes a swipe across the touchscreen in a particular direction.

In different embodiments, the first content recommendation is associated with a first content category, and the method may further include receiving, by the computer system, a content category switch request to a second content category, and sending, by the computer system, a third content recommendation to the first user device, wherein the third content recommendation is associated with the second content category.

In some embodiments, the method may include receiving, by the computer system, an activation of group mode from a second user device associated with a second user included in a friend group that includes a plurality of users, and sending, by the computer system, a third content recommendation to a respective plurality of user devices of the plurality of users. In such cases, the method may also include receiving, by the computer system from the respective user devices, second data indicative of a plurality of respective user decisions from the plurality of users regarding the third content recommendation, determining, by the computer system, a fourth content recommendation using the plurality of respective user decisions from the plurality of users, and sending, by the computer system, the fourth content recommendation to the respective plurality of users devices.

In other embodiments, the method may further include determining, by the computer system, the fourth content recommendation using respective user decision histories of the plurality of users for content recommendations in a common content category with the third content recommendation.

BRIEF DESCRIPTION OF THE DRAWINGS

The following detailed description makes reference to the accompanying drawings, which are now briefly described.

FIG. 14 is a flow diagram depicting an embodiment of a method for operating a computer system used as part of a recommendation integration system within a friend group of multiple users.

FIG. 15 is a flow diagram depicting an embodiment of a method for operating a computer system used as part of a recommendation integration system within a family group of multiple users.

FIG. 16 is a flow diagram depicting an embodiment of a method for cultivating recommendations for a user as part of a recommendation integration system.

DETAILED DESCRIPTION

Delivering content to users can be challenging. Businesses, restaurants, entertainment companies, and individual content creators can have a variety of content which can be difficult to navigate through for a user. For example, when searching an entertainment companies website or streaming platform for content to view, a user may become overwhelmed with the variety of choices and ultimately decide to go elsewhere if it is too difficult to find something to watch.

To assist users, content providers and creators can provide suggestions or recommendations to a user based on that user's previous history. Different content providers and creators can also keep track of individual preferences in different fashions. While this may help a particular content provider or creator suggest a piece of content, such tracking methods are user and platform specific, forcing a user to visit multiple sites or use multiple apps to establish a history with each content provider. Moreover, no provision is made to allow for groups or families to establish common content preferences.

The embodiments described herein may provide techniques to gather preference information from a user or a group of users, and use the preference information to make content recommendations across a wide range of content creators and providers. By integrating the gathering of preference information into a combined experience, users can quickly provide the preference information across the wide range of content creators and providers, as well as collate preference information across a group of users to cultivate a group experience.

Figure 1:
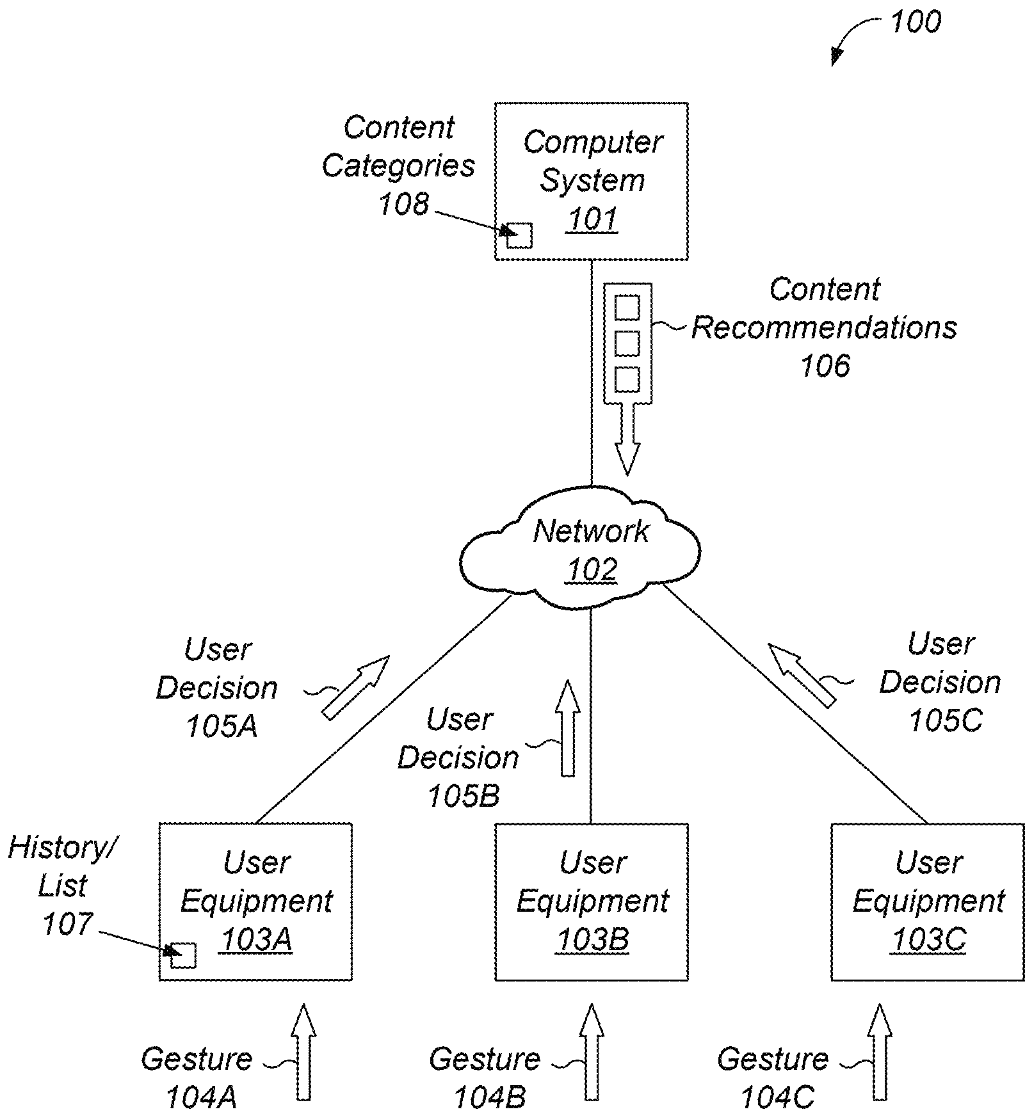
FIG. 1 is a block diagram of an embodiment of a recommendation integration system.

A block diagram of an embodiment of a recommendation integration system is depicted in FIG. 1. As illustrated, recommendation integration system 100 includes computer system 101, network 102, and user equipment 103A-103C. Although a single computer system and three pieces of user equipment are depicted in the embodiment of FIG. 1, in other embodiments, any suitable number of computer systems and pieces of user equipment may be employed.

Computer system 101 is configured to send a particular content recommendation of content recommendations 106 to a particular piece of user equipment of user equipment 103A-103C. For example, computer system 101 may be configured to send the particular content recommendation to user equipment 103A. Content recommendations may, in some embodiments, correspond to a recommendation of a movie, television show, sporting event, etc., for a given user. In some embodiments, a content recommendation may include an image, a video clip, an audio clip, a portion of a text document, or any other suitable data related to a piece of content specified in the content recommendation.

Additionally, computer system 101 is configured to receive, from the particular piece of user equipment, data indicative of a user decision regarding the particular content recommendation. For example, computer system 101 may receive data indicative of user decision 105A from user equipment 103A. In some cases, the data indicative of a user decision may be encrypted, using any suitable algorithm, by a given piece of user equipment 103A-103C, and decrypted by computer system 101. In some cases, an authentication process may be initiated by computer system 101 with a given one of user equipment 103A-103C prior to sending any content recommendation.

In various embodiments, computer system 101 may be configured to send content recommendations 106 to user equipment 103A-103C via network 102. In a similar fashion, user equipment 103A-103C may be configured to transmit user decisions 105A-105C, respectively, to computer system 101 via network 102.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as a network attached storage (NAS), a storage area network (SAN), a content delivery network (CDN), or other forms of computer or machine readable media, for example. A network may include the Internet, one or more local area networks (LANs), one or more wide area networks (WANs), wire-line type connections, wireless type connections, cellular, or any combination thereof. Likewise, sub-networks, which may employ differing architectures, or may be compliant or compatible with differing protocols, may interoperate within a larger network.

In various embodiments, the data indicative of user decisions 105A-105C can include information regarding gestures 104A-104C, respectively. As described below, gestures 104A-104C may be made by corresponding users on touchscreens included in user equipment 103A-103C. In some embodiments, gestures 104A-104C can include respective swipes across the touchscreens of user equipment 103A-103C in respective directions.

Gestures 104A-104C may correspond to different decisions regarding a given content recommendation. For example, gestures 104A-104C may correspond to a user decision of "yes," "no," "maybe/later," or "already seen." Each type of user decision may correspond to a different gesture. For example, a swipe in one direction across a touchscreen may correspond to a "yes," while a swipe in a different direction across the touchscreen may correspond to a "no." Although only four decisions are described in this disclosure, other types of user decisions are possible and contemplated.

Computer system 101 is configured to determine a different content recommendation of content recommendations 106 using a history of user decisions. For example, computer system 101 may determine the different content recommendation using history/list 107 from user equipment 103A. In some cases, a copy of history/list 107 may be stored in computer system 101 in addition to user equipment 103A. In various embodiments, computer system 101 may be further configured to send the different content recommendation to the given user equipment of user equipment 103A-103C.

In various embodiments, user equipment 103A-103C may be configured to edit corresponding histories/lists. For example, user equipment 103A may be configured to edit history/list 107 using inputs from a corresponding user. User equipment 103A may be further configured to transfer an updated version of history/list 107 to computer system 101 via network 102. By allowing a user to edit the history/list, a user can remove incorrect or no longer desirable entries, which can ultimately lead to better content recommendations.

Computer system 101 is configured, in response to a determination that a user decision is an affirmative selection of the particular content recommendation, to send a link to a piece of content included in the particular content recommendation to the particular piece of user equipment. For example, computer system 101 may be configured to send the link to the piece of content to user equipment 103A. Once the particular piece of user equipment receives the link, a corresponding user may consume the corresponding piece of content.

As noted above, a content recommendation may be for a variety of different types or categories of content. To keep track of the different types of content, computer system 101 may be configured to assign different types of content to corresponding ones of content categories 108. In various embodiments, content categories may include such categories as movies, television shows or episodes of television shows, restaurants, consumer electronics, recipes for preparing food, sporting events (live and pre-recorded), highlights of sporting events, restaurants, food delivery options associated with a restaurant, vacation destinations, homes or properties for sale, apartments for rent, clothing, shoes or other footwear, furniture, gardening materials, sporting or outdoor equipment, musical instruments or equipment, gaming (including wagers and bets), mobile phones, home furnishings, computer equipment (including personal computers, laptop computers, and tablets), advertisements, etc. In some embodiments, the content categories can include streaming or content providers, such as video streaming providers, music streaming providers, new delivery providers, sports broadcasting providers, television networks, pay-per-view providers, and the like. In some cases, a given user may, via a corresponding piece of user equipment, e.g., user equipment 103A, send a request to switch content categories to computer system 101. In response to receiving the request, computer system 101 may be configured to provide different ones of content recommendations 106 directed to the new content category.

Figure 2:
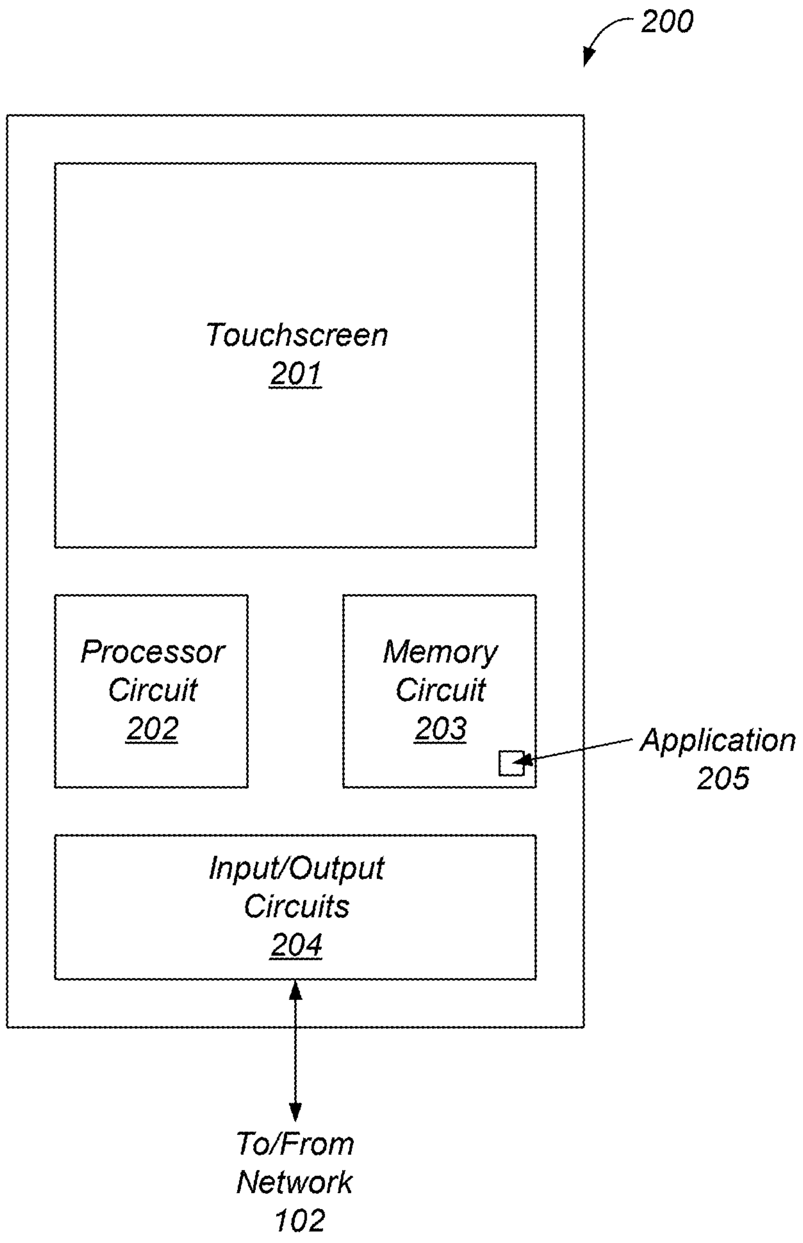
FIG. 2 is a block diagram of an embodiment of a user equipment for use with a recommendation integration system.

Turning to FIG. 2, a block diagram of user equipment is depicted. As illustrated, user equipment 200 includes touchscreen 201, processor circuit 202, memory circuit 203, and input/output circuits 204. In various embodiments, user equipment 200 may correspond to any of user equipment 103A-103C as depicted in FIG. 1. Touchscreen 201, processor circuit 202, memory circuit 203, and input/output circuits 204 may be coupled to each other via a communication bus or channel (not shown).

Touchscreen 201 is configured to receive data via a touch panel and display data via a display panel. In various embodiments, data received via the touch panel may be processed by processor circuit 202 and relayed to computer system 101 via input/output circuits 204. In various embodiments, touchscreen 201 may be implemented using a capacitance touch panel, a resistive touch panel, a force-sensitive touch panel, or any other suitable type of touch panel technology.

Processor circuit 202 may, in various embodiments, be representative of a general-purpose processor configured to perform various operations in response to executing program or software instructions. For example, processor circuit 202 may be a central processing unit (CPU) such as a microprocessor, a microcontroller, an application-specific integrated circuit (ASIC), or a field-programmable gate array (FPGA). While a single processor circuit is depicted in the embodiment of FIG. 2, in other embodiments, multiple processor circuits may be employed. It is noted that, in some embodiments, processor circuit 202 may include multiple processor cores configured to work in unison, or independently, to execute a program or software instructions such as those included in application 205.

Memory circuit 203 is configured to store application 205, and may include any suitable type of memory such as dynamic random-access memory (DRAM), static random-access memory (SRAM), read-only memory (ROM), electrically erasable programmable read-only memory (EEPROM), or non-volatile memory, for example. Although a single memory circuit is depicted in the embodiment of FIG. 2, in other embodiments, any suitable number of memory circuits may be employed.

Input/output circuits 204 may be configured to coordinate data transfer between user equipment 200 and one or more peripheral devices, such as a mass storage device. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 204 may be configured to implement a version of Universal Serial Bus (USB) protocol, IEEE 1394 (Firewire®) protocol, Peripheral Component Interface Express (PCIE), and the like.

Input/output circuits 204 may also be configured to coordinate data transfer between user equipment 200 and one or more devices (e.g., other computing systems or integrated circuits) coupled to user equipment 200 via a network. In some embodiments, input/output circuits 204 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 204 may be configured to implement multiple discrete network interface ports.

Figure 3:
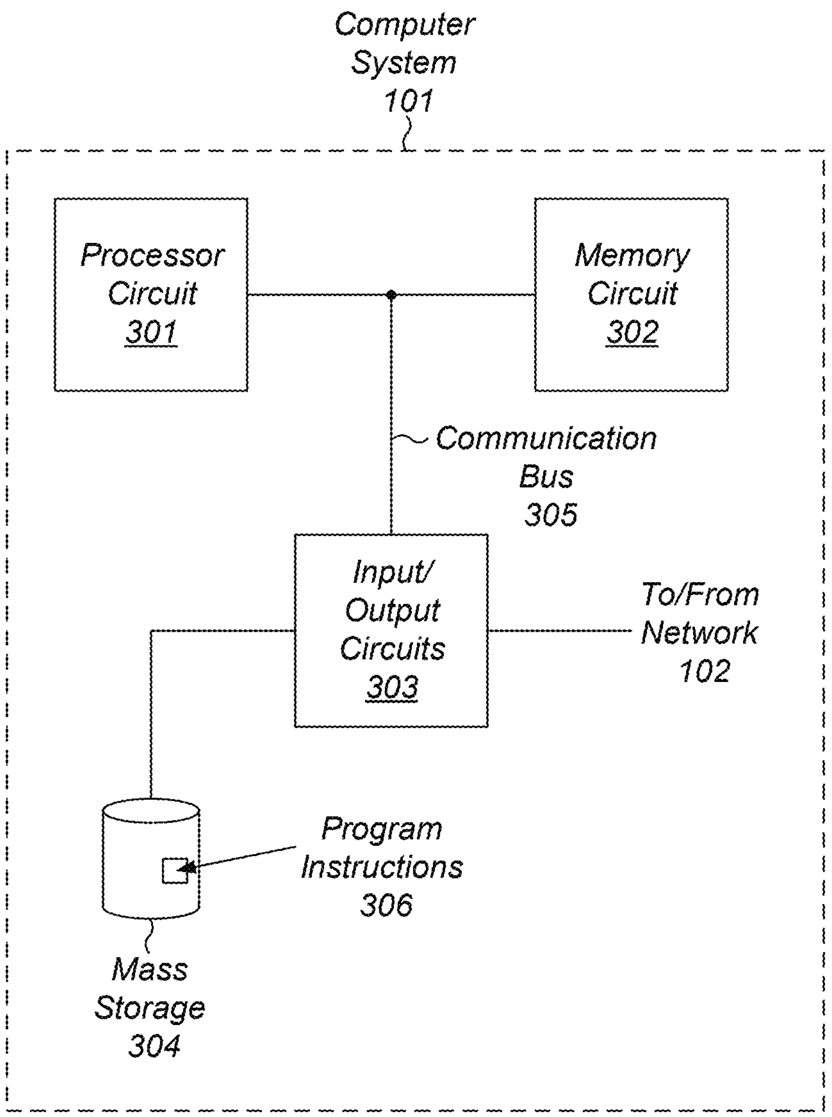
FIG. 3 is a block diagram of an embodiment of a computer system for use with a recommendation integration system.

A block diagram of computer system 101 is depicted in FIG. 3. As illustrated, computer system 101 includes processor circuit 301, memory circuit 302, input/output circuits 303, and mass storage 304. Processor circuit 301, memory circuit 302, and input/output circuits 303 are coupled together via communication bus 305. It is noted that, in various embodiments, computer system 101 may be configured for use in a desktop computer, server, or in a mobile computing application such as a tablet, laptop computer, or wearable computing device. Additionally, computer system 101 may be configured for use in a remote control for a smart television set, or other suitable monitor or display. In some cases, computer system 101 may be configured for use in a gamepad or other game console that is connected to network 102 via either a wired or wireless connection, using any suitable communication protocol, e.g., IEEE 802.11. Additionally, or alternatively, any of the embodiments described here may be configured to use a keyboard, connected to network 102 via either a wired or wireless connection, using any suitable communication protocol, e.g., IEEE 802.11, as an input device.

Some computer systems may include additional components not shown, such as graphics processing unit (GPU) devices, cryptographic co-processors, artificial intelligence (AI) accelerators, or other peripheral devices. In some cases, computer system 101 may further include a display, keypad, an audio interface, and the like, to allow a user to interface with computer system 101.

Processor circuit 301 may, in various embodiments, be representative of a general-purpose processor configured to perform various operations in response to executing program or software instructions. For example, processor circuit 301 may be a central processing unit (CPU) such as a microprocessor, a microcontroller, an application-specific integrated circuit (ASIC), or a field-programmable gate array (FPGA). While a single processor is depicted in the embodiment of FIG. 3, in other embodiments, multiple processors may be employed. It is noted that, in some embodiments, processor circuit 301 may include multiple processor cores configured to work in unison, or independently, to execute a program or software instructions.

Memory circuit 302 may, in various embodiments, include any suitable type of memory such as dynamic random-access memory (DRAM), static random-access memory (SRAM), read-only memory (ROM), electrically erasable programmable read-only memory (EEPROM), or non-volatile memory, for example. Although a single memory is depicted in the embodiment of FIG. 3, in other embodiments, any suitable number of memories may be employed.

Input/output circuits 303 may be configured to coordinate data transfer between computer system 101 and one or more peripheral devices, such as mass storage 304. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 303 may be configured to implement a version of Universal Serial Bus (USB) protocol, IEEE 1394 (Firewire®) protocol, Peripheral Component Interface Express (PCIE), and the like.

Input/output circuits 303 may also be configured to coordinate data transfer between computer system 101 and one or more devices (e.g., other computing systems or integrated circuits) coupled to computer system 101 via a network. In some embodiments, input/output circuits 303 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 303 may be configured to implement multiple discrete network interface ports.

Mass storage 304 may include a non-transitory computer readable storage medium configured to store program instructions 306 or other software instructions, as well as selection information uploaded by a user. In some cases, mass storage 304 may include an installation medium, e.g., a CD-ROM, floppy disks, or a tape device. Alternatively, or additionally, mass storage 304 may include DRAM, double data-rate random-access memory (DDR RAM), SRAM, extended-data-out random-access memory (EDO RAM), Rambus RAM, or any other suitable type of memory. In various embodiments, mass storage 304 may include non-volatile memory such as flash memory, magnetic media, e.g., a hard drive, or optical storage, registers, or other similar types of memory elements, etc. It is noted that mass storage 304 may include any suitable combination of the memory mediums described above, which may reside in different locations, e.g., different computer systems that are connected via a network.

Figure 4:
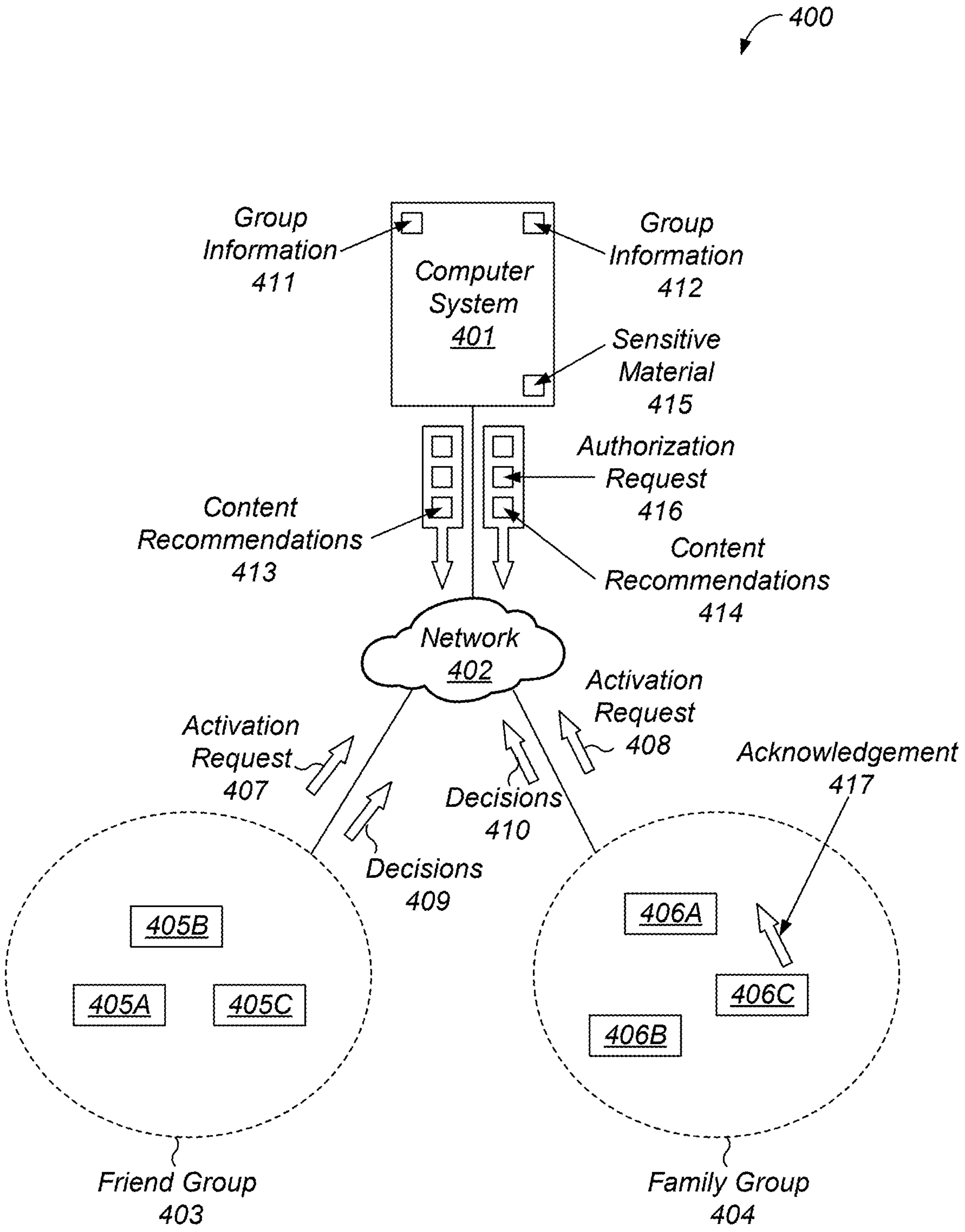
FIG. 4 is a block diagram of an embodiment of a recommendation integration system for multiple groups of users.

Turning to FIG. 4, a block diagram of an embodiment of a recommendation integration system for multiple groups of users is depicted. As illustrated, recommendation integration system 400 includes computer system 401, network 402, friend group 403, and family group 404. In various embodiments, computer system 401 may correspond to computer system 101, and network 402 may correspond to network 102 as depicted in FIG. 1.

Friend group 403 includes users 405A-405C. Although only three users are depicted as being included in friend group 403, in other embodiments, any suitable number of users may be included in friend group 403. Moreover, although only one friend group is depicted in the embodiment of FIG. 4, in other embodiments, any suitable number of friend groups may be in communication with computer system 401 via network 402. In various embodiments, a current user included in friend group 403 can invite other users to join friend group 403. Any of users 405A-405C can elect to leave friend group 403 at any time. In some embodiments, friend group 403 may include users at a common physical location, while, in other embodiments, friend group 403 may include users at different physical locations.

In response to receiving activation request 407 from a particular user in friend group 403, computer system 401 is configured to send content recommendations 413 to users 405A-405C in friend group 403. In various embodiments, any of users 405A-405C can send activation request 407 to computer system 401 from their respective pieces of user equipment. In some embodiments, a list of users included in friend group 403 may be stored in group information 411.

For each of content recommendations 413, users 405A-405C provide decisions 409. As described above, users 405A-405C can provide their respective decisions on a particular content recommendation of content recommendations 413 by swiping on touchscreens on their respective pieces of user equipment.

Using decisions 409 as well as respective decision histories of users 405A-405C, computer system 401 can be configured to determine additional content recommendations. In some cases, computer system 401 may be configured to continue to determine and supply content recommendations to users 405A-405C until a consensus is achieved amongst users 405A-405C. In various embodiments, links to individual user decisions histories of users 405A-405C may be stored as part of group information 411. In some cases, the individual user decision histories of users 405A-405C may include information for ones of users 405A-405C while operating in a single-user mode in addition to while operating as part of friend group 403.

Computer system 401 may be configured to perform a comparison of a number of affirmative decisions received from users 405A-405C for a particular content recommendation to a threshold value, and to determine whether or not consensus has been achieved using results of the comparison. In response to detecting a consensus for a given content recommendation, computer system 401 may be configured to halt the determination of new content recommendations and send a link to a piece of content associated with the given content recommendation to users 405A-405C. In various embodiments, the threshold value may be stored in group information 411 and may be group specific, i.e., one friend group may have one threshold value, while another friend group may have a different threshold value.

Family group 404 includes users 406A-406C. Although only three users are depicted as being included in family group 404, in other embodiments, any suitable number of users may be included in family group 404. Moreover, although only one family group is depicted in the embodiment of FIG. 4, in other embodiments, any suitable number of family groups may be in communication with computer system 401 via network 402. As with friend group 403, group information 412 may include relevant information, e.g., membership of the group, consensus thresholds, decision histories, and the like, regarding family group 404.

Computer system 401 is configured to interact with family group 404 in a similar fashion to that described above with respect to friend group 403. Any of users 406A-406C can send activation request 408 to computer system 401, which, in turn, is configured to determine and send content recommendations 414 to users 406A-406C. Computer system 401 is also configured to receive decisions 410 from users 406A-406C regarding different content recommendations of content recommendations 414.

Computer system 401 is also configured to maintain sensitive material 415. In various embodiments, sensitive material 415 may be provided by a designated user of users 406A-406C. Sensitive materials 415 may include information indicative of content that should not be provided to members of family group 404. For example, sensitive material 415 may include a maximum movie rating for movie content recommendations. In some embodiments, when a particular content recommendation is checked against sensitive material 415 and it is determined that the particular content recommendation may include sensitive material, computer system 401 may be configured to send authorization request 416 to the designated user of users 406A-406C. Computer system 401 may be further configured to send the particular content recommendation to users 406A-406B in response to receiving acknowledgement 417, otherwise computer system 401 may be configured to skip the particular content recommendation and determine a new content recommendation.

Figure 5A:
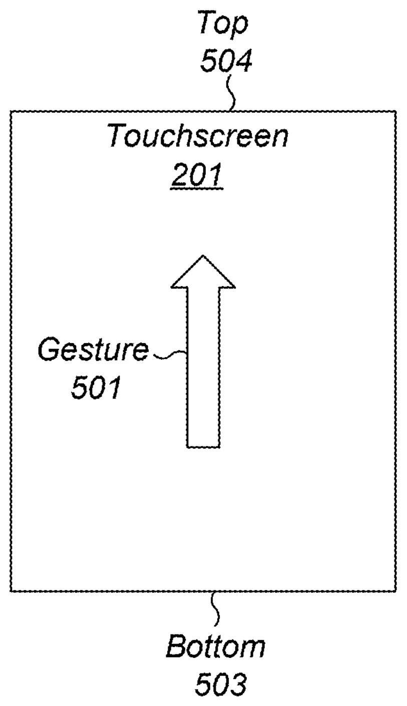
FIG. 5A is a block diagram of an embodiment of a gesture made on a touchscreen to communicate information to a computer system.

Turning to FIG. 5A, a block diagram of an embodiment of a gesture made on a touchscreen to communicate information to a computer system is depicted. As illustrated, gesture 501 follows a path on touchscreen 201 from bottom 503 of touchscreen 201 to top 504 of touchscreen 201. In various embodiments, gesture 501 may correspond to any of the user decisions: yes, no, maybe/later, and seen. Gesture 501 may be traced on touchscreen 201 using a stylus, a finger, or any other suitable object.

Figure 5B:
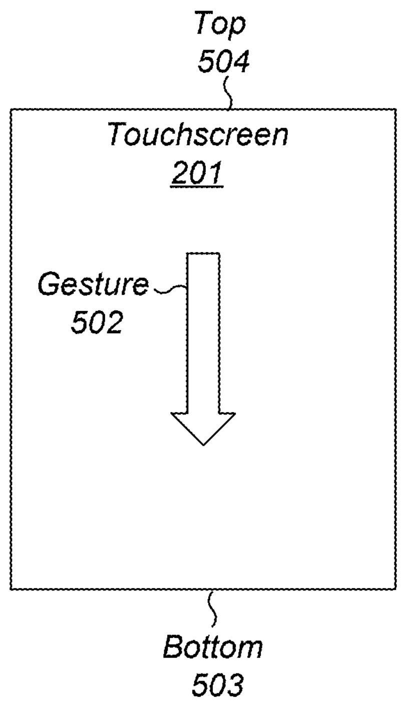
FIG. 5B is a block diagram of an embodiment of another gesture made on a touchscreen to communicate information to a computer system.

Turning to FIG. 5B, a block diagram of an embodiment of another gesture made on a touchscreen to communicate information to a computer system is depicted. As illustrated, gesture 502 follows a path on touchscreen 201 from top 504 of touchscreen 201 to bottom 503 of touchscreen 201. In various embodiments, gesture 502 may correspond to any of the user decisions: yes, no, maybe/later, and seen. Gesture 502 may be traced on touchscreen 201 using a stylus, a finger, or any other suitable object.

Figure 6A:
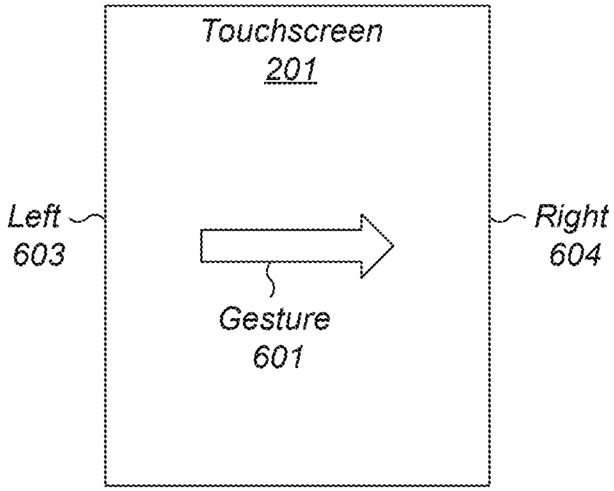
FIG. 6A is a block diagram of an embodiment of another gesture made on a touchscreen to communicate information to a computer system.

Turning to FIG. 6A, a block diagram of an embodiment of another gesture made on a touchscreen to communicate information to a computer system is depicted. As illustrated, gesture 601 follows a path on touchscreen 201 from left 603 of touchscreen 201 to right 604 of touchscreen 201. In various embodiments, gesture 601 may correspond to any of the user decisions: yes, no, maybe/later, and seen. Gesture 601 may be traced on touchscreen 201 using a stylus, a finger, or any other suitable object.

Figure 6B:
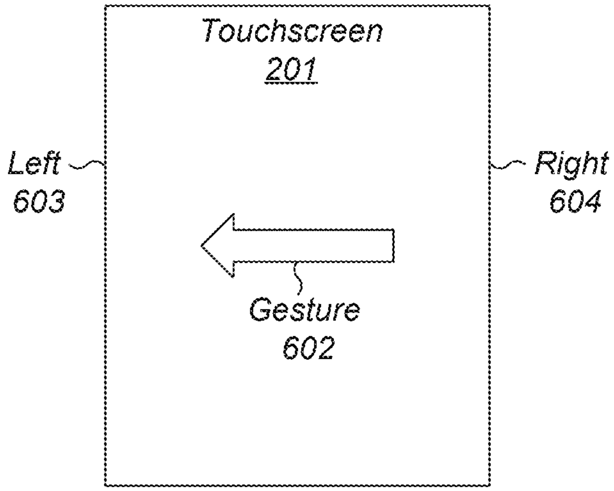
FIG. 6B is a block diagram of an embodiment of another gesture made on a touchscreen to communicate information to a computer system.

Turning to FIG. 6B, a block diagram of an embodiment of another gesture made on a touchscreen to communicate information to a computer system is depicted. As illustrated, gesture 602 follows a path on touchscreen 201 from right 604 of touchscreen 201 to left 603 of touchscreen 201. In various embodiments, gesture 602 may correspond to any of the user decisions: yes, no, maybe/later, and seen. Gesture 602 may be traced on touchscreen 201 using a stylus, a finger, or any other suitable object.

Figure 7A:
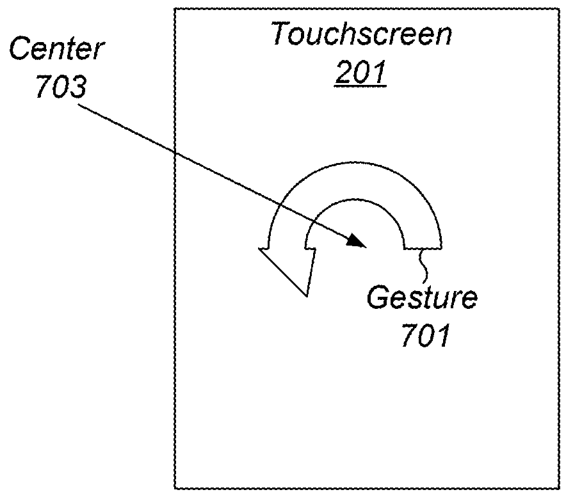
FIG. 7A is a block diagram of an embodiment of another gesture made on a touchscreen to communicate information to a computer system.

Turning to FIG. 7A, a block diagram of an embodiment of another gesture made on a touchscreen to communicate information to a computer system is depicted. As illustrated, gesture 701 follows a path around center 703 of touchscreen 201 in a counterclockwise direction. In various embodiments, gesture 701 may correspond to any of the user decisions: yes, no, maybe/later, and seen. Gesture 701 may be traced on touchscreen 201 using a stylus, a finger, or any other suitable object.

Figure 7B:
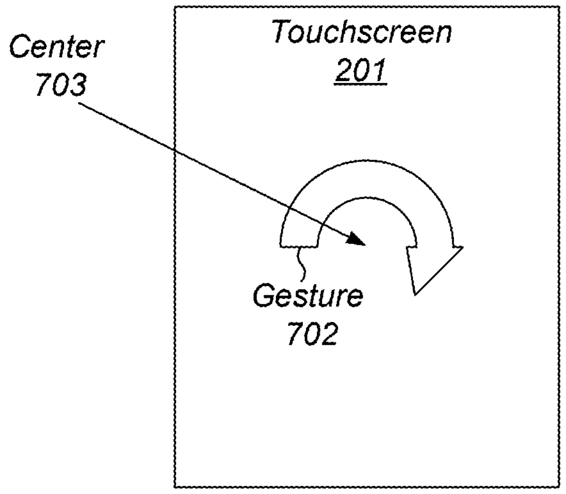
FIG. 7B is a block diagram of an embodiment of another gesture made on a touchscreen to communicate information to a computer system.

Turning to FIG. 7B, a block diagram of an embodiment of another gesture made on a touchscreen to communicate information to a computer system is depicted. As illustrated, gesture 702 follows a path around center 703 of touchscreen 201 in a clockwise direction. In various embodiments, gesture 702 may correspond to any of the user decisions: yes, no, maybe/later, and seen. Gesture 702 may be traced on touchscreen 201 using a stylus, a finger, or any other suitable object.

Figure 8A:
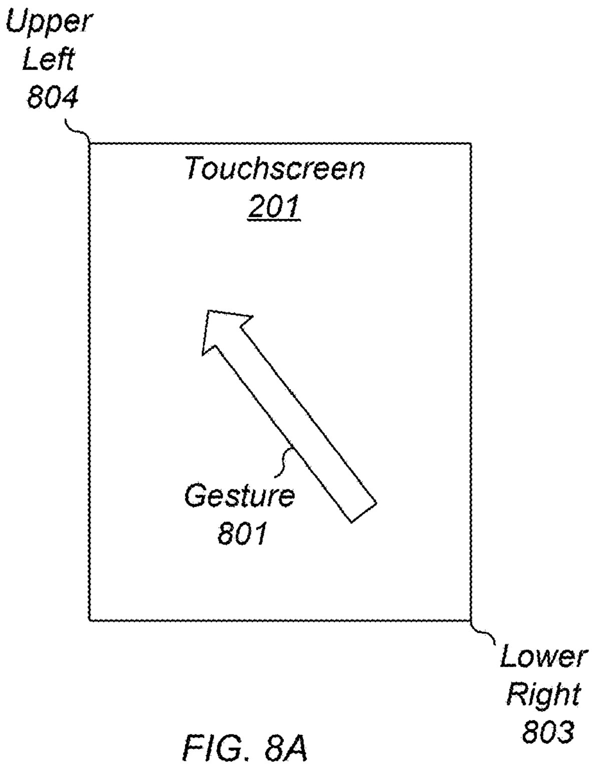
FIG. 8A is a block diagram of an embodiment of another gesture made on a touchscreen to communicate information to a computer system.

Turning to FIG. 8A, a block diagram of an embodiment of another gesture made on a touchscreen to communicate information to a computer system is depicted. As illustrated, gesture 801 follows a path from lower right 803 of touchscreen 201 to upper left 804 of touchscreen 201. In various embodiments, gesture 801 may correspond to any of the user decisions: yes, no, maybe/later, and seen. Gesture 801 may be traced on touchscreen 201 using a stylus, a finger, or any other suitable object.

Figure 8B:
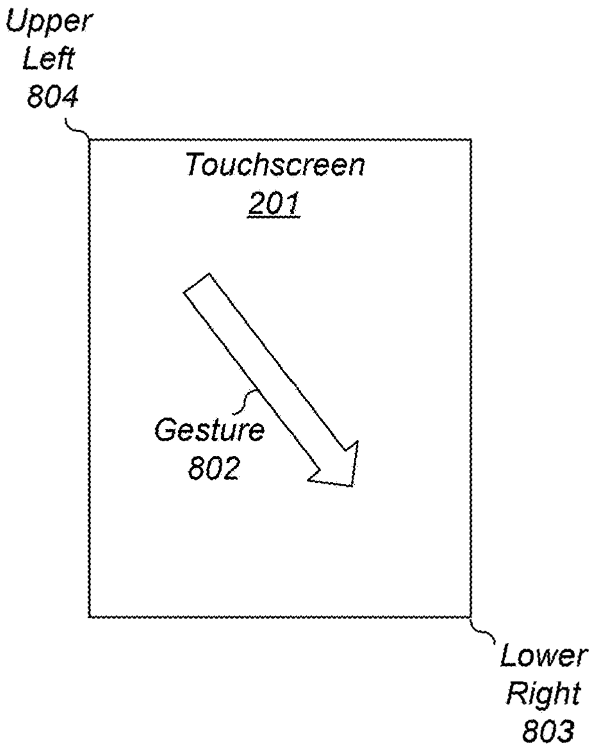
FIG. 8B is a block diagram of an embodiment of another gesture made on a touchscreen to communicate information to a computer system.

Turning to FIG. 8B, a block diagram of an embodiment of another gesture made on a touchscreen to communicate information to a computer system is depicted. As illustrated, gesture 802 follows a path from upper left 804 of touchscreen 201 to lower right 803 of touchscreen 201. In various embodiments, gesture 802 may correspond to any of the user decisions: yes, no, maybe/later, and seen. Gesture 802 may be traced on touchscreen 201 using a stylus, a finger, or any other suitable object.

Figure 9A:
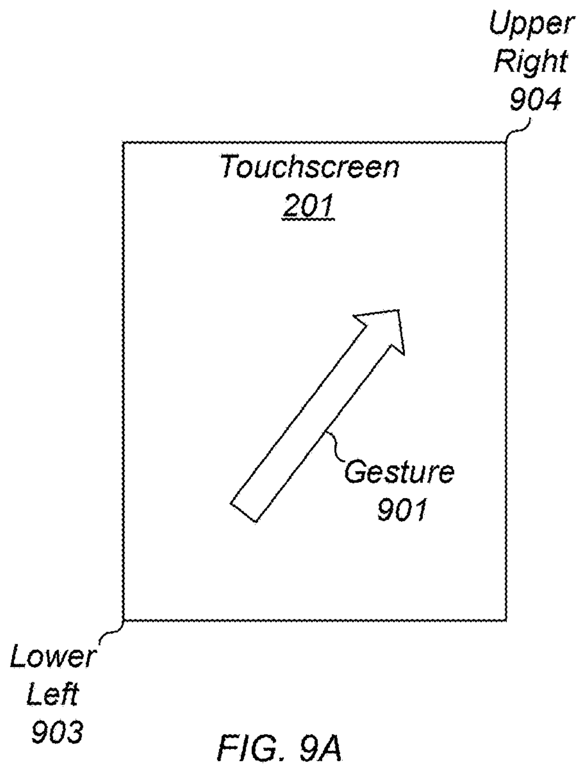
FIG. 9A is a block diagram of an embodiment of another gesture made on a touchscreen to communicate information to a computer system.

Turning to FIG. 9A, a block diagram of an embodiment of another gesture made on a touchscreen to communicate information to a computer system is depicted. As illustrated, gesture 901 follows a path from lower left 903 of touchscreen 201 to upper right 904 of touchscreen 201. In various embodiments, gesture 901 may correspond to any of the user decisions: yes, no, maybe/later, and seen. Gesture 901 may be traced on touchscreen 201 using a stylus, a finger, or any other suitable object.

Figure 9B:
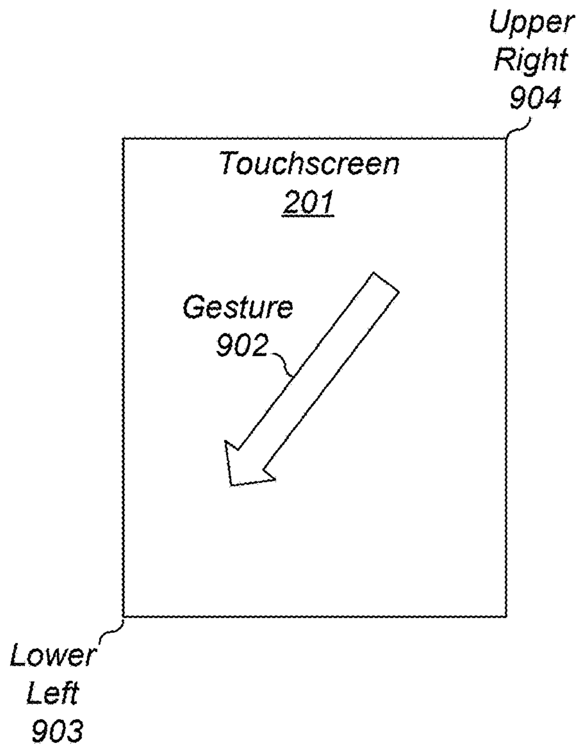
FIG. 9B is a block diagram of an embodiment of another gesture made on a touchscreen to communicate information to a computer system.

Turning to FIG. 9B, a block diagram of an embodiment of another gesture made on a touchscreen to communicate information to a computer system is depicted. As illustrated, gesture 902 follows a path from upper right 904 of touchscreen 201 to lower left 903 of touchscreen 201. In various embodiments, gesture 902 may correspond to any of the user decisions: yes, no, maybe/later, and seen. Gesture 902 may be traced on touchscreen 201 using a stylus, a finger, or any other suitable object.

Figure 10:
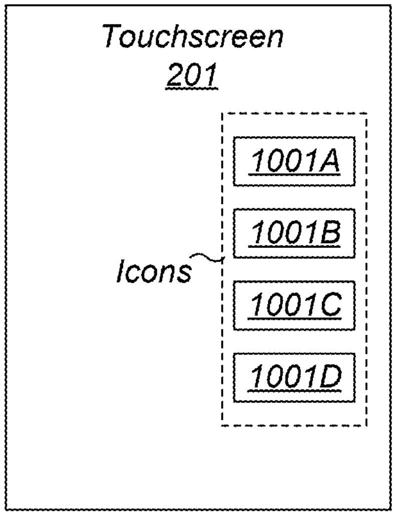
FIG. 10 is a block diagram of an embodiment of icons on a touchscreen to communicate information to a computer system.

Turning to FIG. 10, a block diagram of an embodiment of icons on a touchscreen to communicate information to a computer system is depicted. As illustrated, touchscreen 201 is configured to display icons 1001A-1001D. Although only four icons are depicted in the embodiment of FIG. 10, in other embodiments, any suitable number of icons may be employed. In various embodiments, icons 1001A-1001D may correspond to the users decisions yes, no, maybe/later, and seen. For example, icon 1001A may correspond to user decision yes, icon 1001B may correspond to user decision no, icon 1001C may correspond to user decision maybe/later, and icon 1001D may correspond to user decision seen.

In various embodiments, any of icons 1001A-1001D may be selected by touching one of icons 1001A-1001D with a stylus, finger, or any other suitable object. It is noted that icons 1001A-1001D may be used in conjunction with one or more of the gestures depicted in FIGS. 5A, 5B, 6A, 6B, 7A, 7B, 8A, 8B, 9A, and 9B.

Figure 11:
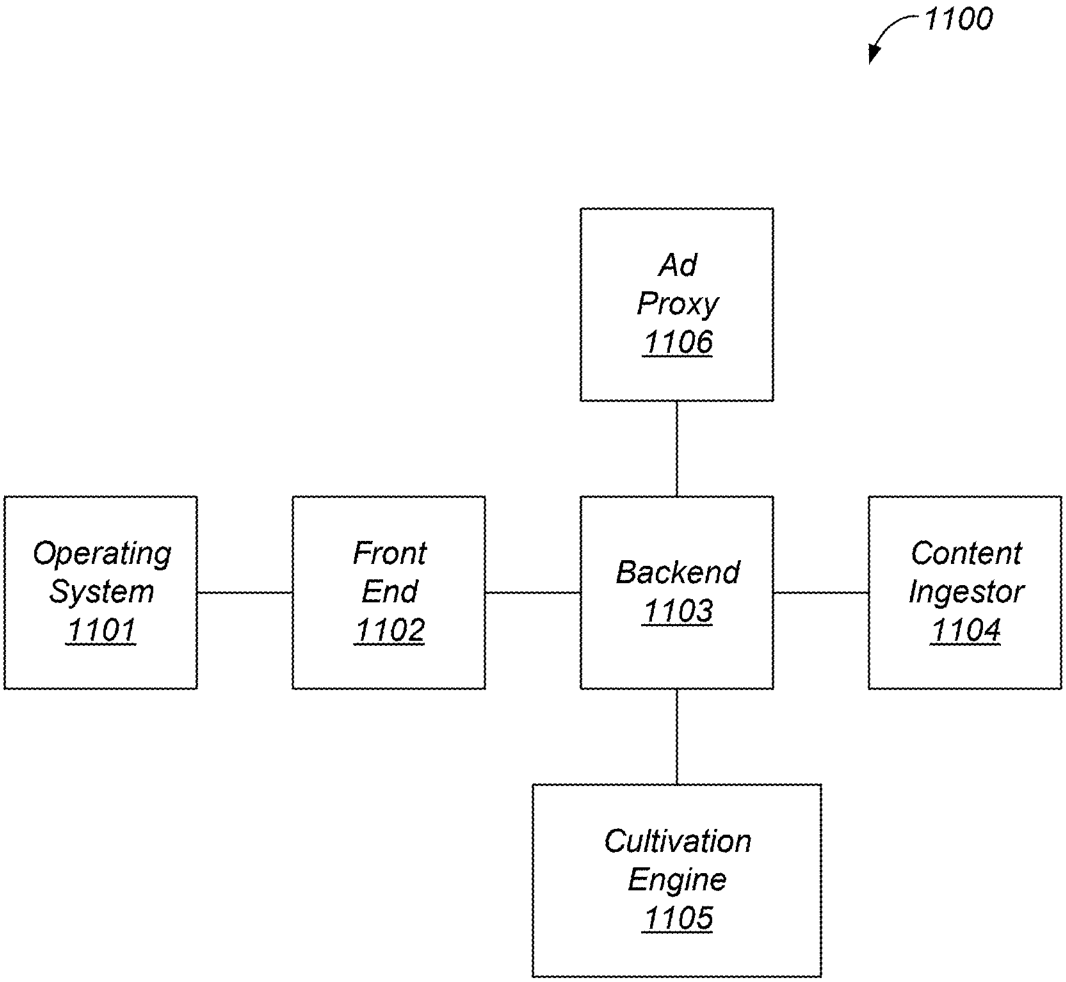
FIG. 11 is a block diagram depicting an embodiment of a recommendation integration application.

Turning to FIG. 11, a block diagram of an embodiment of a recommendation integration application is depicted. As illustrated, recommendation integration application 1100 includes operating system 1101, front end 1102, backend 1103, content ingestor 1104, ad proxy 1106, and cultivation engine 1105. In various embodiments, any or all of operating system 1101, front end 1102, backend 1103, content ingestor 1104, ad proxy 1106, and cultivation engine 1105 may be included as part of program instructions 306.

Operating system 1101 may, in various embodiments, correspond to a software development kit for an operating system of a particular piece of user equipment. For example, operating system 1101 may correspond to software development kits for iOS or Android operating systems. In some cases, the recommendation integration application may be run using a web page, in which operating system 1101 may correspond to a software developer kit for a web browser.

Front end 1102 may be configured to receive user decision information from various pieces of user equipment. In various embodiments, front end 1102 may work with operating system 1101 to decode data received from the pieces of user equipment, and relay the decoded information to backend 1103. In some embodiments, front end 1102 may be further configured to receive and analyze behaviormetric data from a given user.

Backend 1103 may be configured to receive information from front end 1102, ad proxy 1106, and content ingestor 1104. In various embodiments, backend 1103 may transfer portions of received information to cultivation engine 1105 to allow for the determination of content predictions.

Content ingestor 1104 may be configured to receive new content and format the content to be compatible with a content database. In some embodiments, content ingestor 1104 may assign a particular piece of content to a particular content category. In various embodiments, content ingestor 1104 may be further configured to pre-process newly received content to generate corresponding vector information for use with a prediction or selection algorithm employed by cultivation engine 1105.

As described below, cultivation engine 1105 is configured to generate content recommendations. In various embodiments, cultivation engine 1105 may select or predict content recommendations based on a content database and/or a history of user decisions regarding previous content recommendations.

User behavior can be used in creating personalized and intuitive experiences. In some embodiments, gestures performed on touchscreens can provide a source of behaviormetric data from which a user's emotional state can be inferred. In some cases, behaviormetric data received by front end 1102 may include acceleration, accuracy, pressure, and the like, for gestures received from user equipment. Cultivation engine 1105 may be configured to analyze such behaviormetric data to determine a profile of a user's mood. For example, the acceleration of a swipe gesture can indicate a user's level of excitement or frustration. In some cases, a swipe gesture may be compared to predetermined targets to determine an accuracy of the swipe gesture which can provide insight into a user's focus and mental clarity. In other cases, pressure sensitive components within a user device can be employed to determine a pressure of a swipe gesture which can provide insight into the emotional intensity of a user.

Cultivation engine 1105 may, in some embodiments, be configured to analyze additional factors such as swipe direction, duration, rhythm, and the like, to refine a user's behaviormetric profile. In some embodiments, cultivation engine 1105 may be further configured to use a combination of the measures described above in conjunction with the recommendation algorithms described herein to generate content recommendations.

In some embodiments, cultivation engine 1105 may use behaviormetric data received by front end 1102. In some cases, such behaviormetric data may be used in conjunction with user decision information to further refine content recommendations. For example, behaviormetric data could be used to determine a user's emotional state or mood, which can be used to modulate a corresponding piece of user decision information. For example, a stressed user mood could lead to a different content recommendation for a given piece of user decision information than a more passive or relaxed user mood.

Ad proxy 1106 is configured to receive advertisement data from one or more advertisement servers, and relay the advertisement data to backend 1103 for further use by cultivation engine 1105. Although only a single proxy is depicted in the embodiment of FIG. 11, in other embodiments, any suitable number of proxies connected to corresponding servers may be employed.

It is noted that the embodiment of the recommendation integration application depicted in FIG. 11 is merely an example. In other embodiments, different functional blocks may be employed as well as different interfaces to content creators or providers.

Figure 12:
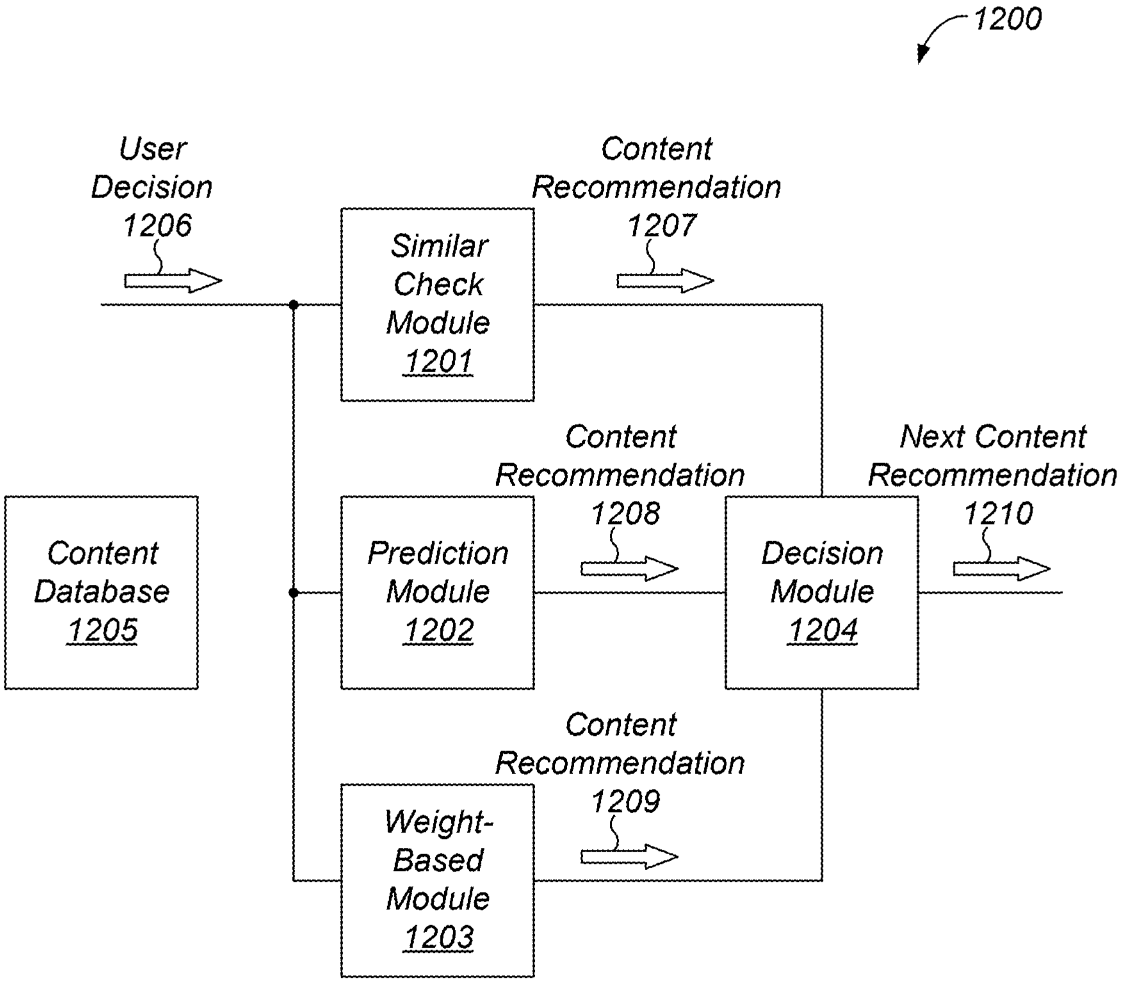
FIG. 12 is a block diagram depicting an embodiment of a cultivation engine used in a recommendation integration application.

Turning to FIG. 12, a block diagram of an embodiment of a cultivation engine is depicted. Cultivation engine 1200 may, in some embodiments, correspond to cultivation engine 1105 as depicted in the embodiment of FIG. 11. As illustrated, cultivation engine 1200 includes similar check module 1201, prediction module 1202, weight-based module 1203, decision module 1204, and content database 1205.

Similar check module 1201 is configured to receive user decision 1206. In various embodiments, user decision 1206 may correspond to any of user decisions 105A-105C, or decisions 409 or 410. In various embodiments, data indicative of user decision 1206 may be encrypted. In such cases, any of similar check module 1201, prediction module 1202, or weight-based module 1203 may be configured to decrypt the data indicative of user decision 1206.

Similar check module 1201 can be configured to check, in response to a determination that user decision 1206 is an affirmative response to a particular content recommendation, for similar content in content database 1205 to determine content recommendation 1207. In various embodiments, to check for such similar content, similar check module 1201 may be further configured to convert at least a portion of the particular content recommendation to a vector, e.g., executing a word2vec operation, for comparison. Similar check module 1201 may be further configured to compare the vector to vector representations of the content included in content database 1205 using a Siamese neural network, a Jaccard algorithm, or any other suitable technique for comparing objects.

Prediction module 1202 can be configured to predict content recommendation 1208. In various embodiments, prediction module 1202 may be configured to predict content recommendation 1208 using a history of user decisions associated with the user that generated user decision 1206. In some embodiments, to predict content recommendations, prediction module 1202 may be further configured to perform a singular value decomposition (SVD), perform a k-nearest neighbor neighbors (KNN) prediction, perform a non-negative matrix factorization (NFM), or any other suitable predictive algorithm. In various embodiments, any of the predictive algorithms may be trained on content included in content database 1205.

Weight-based module 1203 can be configured to select, from content database 1205, content recommendation 1209 using a weight-based selection system. In various embodiments, to select content recommendation 1209, weight-based module 1203 may be further configured to perform neural collaborative filtering. Alternatively, or additionally, weight-based module 1203 may use a recurrent neural network (RNN) trained on the content in content database 1205 and/or the history of user decisions. In some embodiments, to select content recommendation 1209, weight-based module 1203 may employ a graph neural network (GNN), or other suitable neural network or machine-learning technique.

Decision module 1204 may be configured to determine next content recommendation 1210 using at least one of content recommendation 1207, content recommendation 1208, or content recommendation 1209. In various embodiments, determining next content recommendation 1210 may be based on an operation mode of the cultivation engine. In some cases, decision module 1204 may be configured to operate in different operation modes, which may correspond to the different techniques described above for determining the possible content recommendations. In other embodiments, content recommendations 1207-1209 may be used in sequence, or in a random order, as next content recommendations.

In some cases, different types of recommendation algorithms may be employed for different content categories. Such algorithms may be developed to address specific challenges and needs that arise for the different content categories. As described below, cultivation engine 1200 may employ different techniques or combination of techniques based on a user's selection of content category.

In e-commerce, one goal is to maximize sales and customer satisfaction. By using methods such as purchase history analysis, similarity matching, and cross-selling, cultivation engine 1200 can be configured to recommend products that are frequently purchased together or that complement each other. In various embodiments, cultivation engine 1200 may employ collaborative filtering and content-based filtering to enhance recommendation accuracy.

For streaming content, cultivation engine 1200 may be configured to review a user's past viewing and listening behaviors in order to generate new content recommendations. In various embodiments, by analyzing user preferences, cultivation engine 1200 may, in some embodiments, identify programs or songs that have received positive feedback from similar users in order to generate content recommendations.

Cultivation engine 1200 can, in some embodiments, be configured to generate content recommendations for new feeds from social media platforms. In various embodiments, cultivation engine 1200 can be configured to analyze user interactions, friends, and "liked" posts to prioritize content for content recommendations that are more relevant and engaging for a user. In some embodiments, cultivation engine 1200 may additionally analyze social signals and perform a sentiment analysis to determine relevant content recommendations for a user.

Cultivation engine 1200 may, in other embodiments, be configured to analyze a user's past travel experiences and interests to generate travel and tourism content recommendations. By employing past travel experiences and interests, the content recommendations generated by cultivation engine 1200 may provide relevant and exciting alternatives to a given user.

In a healthcare and medicine content category, cultivation engine 1200 may be configured to generate content recommendations directed to personal medical advice, medications, and treatments for a given patient/user. In various embodiments, cultivation engine 1200 may employ the patient's medical history and specific needs in order to recommend the most suitable options for the patient.

Cultivation engine 1200 may also be configured to generate content recommendations for tailoring learning experiences for students. In various embodiments, cultivation engine 1200 may be configured to analyze a given student's performance, interests, and previous courses to generate recommendations for courses and resources.

In some embodiments, cultivation engine 1200 may be configured to generate content recommendations for types of games for users. Cultivation engine 1200 may be further configured to analyze a user's gaming history and purchases to generate the content recommendations.

Additionally, cultivation engine 1200 can be configured to generate recommendations for a prospective job seeker based on their curriculum vitae, experience, and interests. In other embodiments, cultivation engine 1200 may also be configured to generate, for an employer, recommendations of possible candidates for a given open job position.

In some embodiments, cultivation engine 1200 may be configured to generate content recommendations for investment options and financial services. To generate such recommendations, cultivation engine 1200 may be additionally configured to analyze a user's financial goals and risk profiles.

As described above, cultivation engine 1200 may employ multiple algorithms or techniques for generating content recommendations. In various embodiments, cultivation engine 1200 may select different ones of the algorithms and techniques described below based on a given content category. In some embodiments, cultivation engine 1200 may combine two or more techniques for a particular content category.

Cultivation engine 1200 may be configured to perform user collaborative filtering to generate content recommendations. In some cases, cultivation engine 1200 may use a user-based filtering approach while, in other cases, cultivation engine 1200 may use an item-based filtering approach. In some embodiments, cultivation engine 1200 may be further configured to use collaborative filtering in conjunction with another technique, e.g., content-based filtering, to remediate "cold start" effects where a new user or a new item is introduced into the system and there is not historical data for the new user or the new item.

In the user-based approach, cultivation engine 1200 may be configured to generate content recommendations based on similarities between different users. For example, if two users have rated the same items with the same ratings, the commonality can be used to generate a recommendation for a particular one of the two users based on an item previously purchased by a different one of the two users.

In the item-based approach, cultivation engine 1200 may be configured to analyze how different items are rated by a particular user. Based on such an analysis, cultivation engine 1200 can be configured to identify which items tend to be appreciated by a particular set of users.

In some embodiments, cultivation engine 1200 may employ content-based filtering to generate content recommendations. To perform content-based filtering, cultivation engine 1200 may be further configured to analyze attributes associated with a given item. Such attributes may include genre, topics, textual descriptions, and the like.

Cultivation engine 1200 may be configured to employ a variety of techniques to extract and represent the attributes. For example, cultivation engine 1200 may be configured to employ term frequency-inverse document frequency, vectorization, or word embedding.

By employing content-based filtering, cultivation engine 1200 may, in some embodiments, be able to learn from a user's past interactions that are used to build a profile of the user's interests. The profile may, in some cases, be used to identify and recommend other objects and items with similar characteristics.

As described above, cultivation engine 1200 may be configured to employ multiple approaches (referred to as a "hybrid method") to generate content recommendations in order to create a robust and dynamic system that can adapt to different user's behaviors and preferences more quickly and allow for a more personalized user experience.

To implement a hybrid method, cultivation engine 1200 may be configured to apply respective weights to respective recommendations generated by multiple algorithms. Alternatively, or additionally, cultivation engine 1200 may dynamically select different recommendations from the multiple algorithms based on user behavior. Cultivation engine 1200 may, in some embodiments, be configured to execute multiple algorithms in parallel and combine the respective recommendations from the multiple algorithms to determine a final content recommendation.

In various embodiments, cultivation engine 1200 can be configured to perform supervised learning. To perform supervised learning, cultivation engine 1200 may be further configured to train a model using a dataset that includes both inputs (features) and their corresponding outputs (labels). For example, cultivation engine 1200 may be configured to train a model on a dataset of user interactions that include known ratings, purchases, or views. Cultivation engine 1200 may be configured to identify patterns and relationships in the data to train the model. Once trained, the model can be used to extrapolate to make recommendations for new items.

To perform supervised learning, cultivation engine 1200 may be configured to employ regression and classification methods. Regression models can be used to predict numerical ratings, while classification methods can be applied to determine whether or not a user will like or dislike an item.

In some cases, the availability of data may affect the ability of cultivation engine 1200 to train a model. In case where the data used for training is sparse, biased, or not representative of a user base, cultivation engine 1200 may generate poor content recommendations. To remediate at least some of these issues, cultivation engine 1200 may be configured to combine supervised learning with unsupervised learning, reinforcement learning, and the like.

Cultivation engine 1200 may, in some cases, be configured to employ deep learning using a deep (or neural) network that includes multiple layers of neurons. In various embodiments, cultivation engine 1200 can employ deep learning to model complex relationships between users and items. In such cases, the neural network can be trained using user data such as ratings, interactions, demographic information, and the like. Cultivation engine 1200 may be configured to learn to identify non-linear relationships and patterns that traditional algorithms struggle to identify.

In various embodiments, cultivation engine 1200 may be implemented using convolution neural networks (CNNs) or recurrent neural networks (RNNs), or a combination thereof. CNNs may be used in analyzing image and/or video data, while RNNs may be used in analyzing sequential data such as text and time series.

In some embodiments, cultivation engine 1200 may be configured to implement reinforcement learning to train a model that can be used to make content recommendations. To implement reinforcement learning, cultivation engine 1200 may be configured to explore and iteratively interact with its environment to maximize a reward signal. In various embodiments, the reward signal may be defined in various ways dependent upon the specific recommendation problem.

Cultivation engine 1200 may be configured to maximize a cumulative reward, i.e., identify which actions lead to the most beneficial outcomes over time. For example, reinforcement learning can be used in conjunction with a streaming service to determine content recommendations for movies or television shows based on how a user reacts to previous content recommendations.

In some embodiments, cultivation engine 1200 is configured to use probabilistic and statistical models to generate content recommendations. Such models are generated using probability principles and statistical theory to analyze patterns in user data in order to generate content recommendations.

Cultivation engine 1200 may be configured to employ Bayesian ranking, or more specifically Bayesian personalized ranking (BPR) to optimize the ranking of user preferences by focusing on the differences between positive and negative interactions. Additionally, or alternatively, cultivation engine 1200 may be configured to use hidden Markov models (HMMs) to model sequential data and time-dependent behavior.

In some cases, such probabilistic and statistical models may struggle with high-dimensional data involving numerous variables. As with some previously mentioned methods, cultivation engine 1200 may be configured to employ a hybrid method which combines statistical methods with machine learning methods.

Cultivation engine 1200 may, in some embodiments, be configured to use a graph-based method to generate content recommendations. By representing user, items, and their interactions as nodes and edges in a graph, a deeper understanding of complex relationships that exist within the data can be realized.

A graph can consist of a set of nodes that represent users or items, and edges that represent relationships or interactions between the nodes. Cultivation engine 1200 may be configured to analyze a graph to identify common patterns and associations that can be used to generate content recommendations.

To analyze a graph, cultivation engine 1200 may employ different algorithms such as personalized PageRank and graph neural networks (GNNs). Such algorithms can be used to propagate relevance through the network to improve content recommendations based on both direct and indirect relationships. In some embodiments, cultivation engine 1200 may be configured to capture both local and global structures within the graph to improve precision. In some cases, GNNs can be configured to learn to represent nodes and edges in higher dimensions which can help uncover hidden patterns within the data.

Cultivation engine 1200 may be configured to employ natural language processing (NLP) in order to generate content recommendations. NLP-based methods may be employed to process and analyze text data to allow for an understanding of a user's intentions and preferences.

In various embodiments, to implement an NLP-based method, cultivation engine 1200 may be configured to translate text into a vector. For example, cultivation engine 1200 may be configured to use Word2Vec, GloVe, FastText, or any other suitable application to convert text into vectors that can be used to understand the relationships between different items and user's preferences. Cultivation engine 1200 may, in some embodiments, use NLP-based methods to analyze user reviews, comments, search histories, and the like, to understand a user's preferences and behaviors.

In some embodiments, cultivation engine 1200 may be configured to employ external-signal based methods to generate content recommendations. To employ such methods, cultivation engine 1200 may be further configured to integrate external data such as, but not limited to, social signals, contextual information, sentiment analysis, and the like.

Contextual information, e.g., location, time, etc., can be used as external signals. Such factors can allow cultivation engine 1200 to provide more relevant and well-timed content recommendations to a user. Sentiment analysis can include the analysis of emotions and opinions expressed in reviews, comments, or social media. For example, cultivation engine 1200 may be configured to recommend products or services that have received positive reviews while avoiding options with negative reviews. In various embodiments, cultivation engine 1200 may employ one or more security protocols, e.g., encryptions, when dealing with external data, particularly where the external data includes personal information.

In some cases, cultivation engine 1200 may employ online or real-time optimization to generate content recommendations. The user of such optimization can, in some embodiments, allow cultivation engine 1200 to make rapid adjustments and continuous improvements of content recommendations to meet a user's needs.

Cultivation engine 1200 may, in some embodiments, employ A/B testing as part of online optimization. In various embodiments, A/B testing includes presenting a group of users with different versions of a content recommendation, and measuring which version yields the best results. Such a feedback-driven approach may, in certain embodiments, allow cultivation engine 1200 to adapt to shifts in user preferences and satisfaction.

In some embodiments, cultivation engine 1200 may be configured to analyze an incoming stream of data in real time. The stream of data may include user interactions, searches, comments, and the like. The use of such data can allow for cultivation engine 1200 to quickly adapt to and anticipate a user's next actions.

Figure 13:
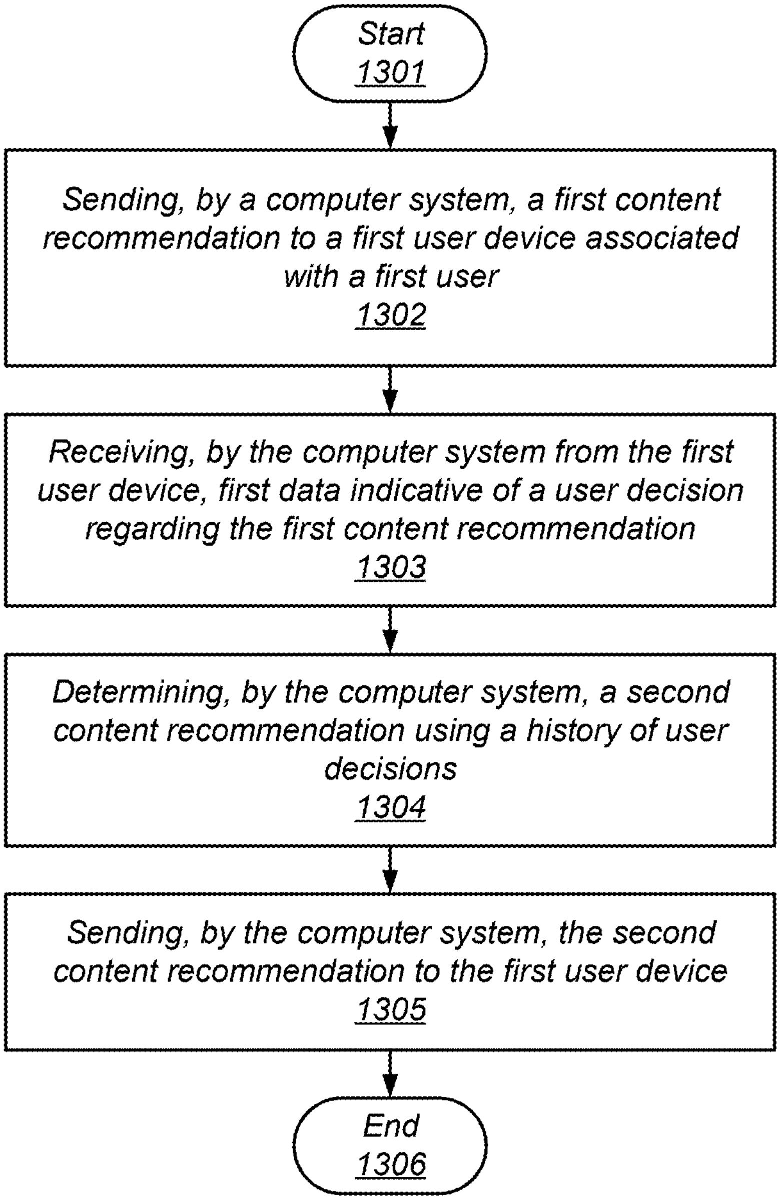
FIG. 13 is a flow diagram depicting an embodiment of a method for operating a computer system used as part of a recommendation integration system.

Turning to FIG. 13, a flow diagram depicting an embodiment of a method for operating a computer system used as part of a recommendation integration system is illustrated. The method, which may be applied to various computer systems, e.g., computer system 101, begins in block 1301.

The method includes sending, by a computer system, a first content recommendation to a first user device associated with a first user (block 1302). In various embodiments, the computer may send the first content recommendation via a network or other suitable connection between the first user device and the computer system. In various embodiments, the first content recommendation may include an image, a video clip, an audio clip, or any other suitable media relating to the first content recommendation.

The method also includes receiving, by the computer system from the first user device, first data indicative of a user decision regarding the first content recommendation (block 1303). In some embodiments, the first data includes information regarding a gesture made on a touchscreen included in the first user device. In some cases, the method may further include translating, by the first user device, the gesture made on the touchscreen to a value of the user decision. In other embodiments, the first data may be encrypted by the first user device and decrypted by the computer system.

The method further includes determining, by the computer system, a second content recommendation using a history of user decisions (block 1304). In various embodiments, determining the second content recommendation can further include checking for similar content to the first content recommendation in a database that includes the first content recommendation and the second content recommendation. In other embodiments, the history of user decisions includes a plurality of user decisions with associated weights.

The method also includes sending, by the computer system, the second content recommendation to the first user device (block 1305). In various embodiments, the computer may send the second content recommendation via the network or other suitable connection between the first user device and the computer system. In various embodiments, the second content recommendation may include an image, a video clip, an audio clip, or any other suitable media relating to the second content recommendation.

In some embodiments, the first content recommendation is associated with a first content category. In such cases, the method may further include receiving, by the computer system, a content category switch request to a second content category, and sending, by the computer system, a third content recommendation to the first user device, wherein the third content recommendation is associated with a second content category.

In various embodiments, the method may additionally include sending, by the computer device in response to determining the first user decision is an affirmative choice for the first content recommendation, a link to media corresponding to the first content recommendation. The method concludes in block 1306. It is noted that the embodiment of the method depicted in the flow diagram of FIG. 13 can, in various embodiments, be used in conjunction with any of the method depicted in FIGS. 14, 15, and 16.

Turning to FIG. 14, a flow diagram depicting an embodiment of a method for operating a computer system used as part of recommendation integration system within a friend group of multiple users is illustrated. The method, which may be applied to various computer systems, e.g., computer system 101, begins in block 1401.

The method includes receiving, by a computer system, an activation of a group mode from a user device associated with a user included in a friend group that includes a plurality of users (block 1402). In some embodiments, the method may further include sending, by the computer system in response to receiving the activation, a notification to the plurality of users that one user of the friend group wants the group to be active. In various embodiments, a current user included in the friend group can invite other users to join the friend group. Any users included in the friend group can elect to leave the friend group at any time.

The method also includes sending, by the computer system, a particular content recommendation to a respective plurality of user devices of the plurality of users (block 1403). In various embodiments, the particular content recommendation may include an image, a video clip, an audio clip, or any other suitable media relating to the particular content recommendation.

The method further includes receiving, by the computer system from the respective plurality of user devices, data indicative of a plurality of respective user decisions from the plurality of users regarding the particular content recommendation (block 1404). In various embodiments, the method may additionally include tracking, by the computer system, a time period during which user decisions for the particular content recommendation are accepted.

The method also includes determining, by the computer system, a different content recommendation using the plurality of respective user decisions from the plurality of users (block 1405). In some embodiments, the method may further include determining, by the computer system, the different content recommendation using respective user decision histories of the plurality of users.

The method further includes sending, by the computer system, the different content recommendation to the respective plurality of user devices (block 1406). In various embodiments, the different content recommendation may include an image, a video clip, an audio clip, or any other suitable media relating to the different content recommendations.

In various embodiments, the method may include sending, by the computer device in response to determining that an aggregate affirmative choice (or consensus) for the particular content recommendation has been achieved, a link to media corresponding to the particular content recommendation to the plurality of user devices. In some embodiments, the method may include performing, by the computer system, a comparison of a number of affirmative user decisions from the plurality of users for the particular content recommendation to a threshold value and determining the aggregate affirmative choice for the particular content recommendation using a result of the comparison.

The method concludes in block 1407. It is noted that the embodiment of the method depicted in the flow diagram of FIG. 14 can, in various embodiments, be used in conjunction with any of the methods depicted in FIGS. 13, 15, and 16.

Turning to FIG. 15, a flow diagram depicting an embodiment of a method for operating a computer system used as part of recommendation integration system within a family group of multiple users is illustrated. The method, which may be applied to various computer systems, e.g., computer system 101, begins in block 1501.

The method includes receiving, by a computer system, an activation of a group mode from a user device associated with a user included in a family group that includes a plurality of users (block 1502). In various embodiments, the method may include receiving, by the computer system, a list of sensitive material from a particular user device associated with a designated user of the plurality of users. The list of sensitive material may, in various embodiments, include topics, lyrics, ratings, etc., to which the designated user wants to restrict access. For example, the list of sensitive material may include an R movie rating.

The method also includes sending, by the computer system, a particular content recommendation to a respective plurality of user devices of the plurality of users (block 1503). In some embodiments, the method may include sending, by the computer system, an authorization request for the particular content recommendation to the designated user via the designated user particular user device. In such cases, the method may additionally include sending, by the computer system, the particular content recommendation to the respective plurality of user devices in response to receiving a confirmation message to the authorization request from the designated user.

The method further includes receiving, by the computer system from the respective plurality of user devices, data indicative of a plurality of user decisions from the plurality of users regarding the particular content recommendation (block 1504).

The method also includes determining, by the computer system, a different content recommendation using the plurality of user decisions from the plurality of users (block 1505). In various embodiments, determining, by the computer system, the different content recommendation includes performing, by the computer system, a check of the different content recommendation against the list of sensitive material. In such cases, the method may additionally include determining, by the computer system, another content recommendation in response to determining that the different content recommendation includes at least one item included in the list of sensitive material.

The method further includes sending, by the computer system, the different content recommendation to the respective plurality of user devices (block 1506). In various embodiments, the different content recommendation may include an image, a video clip, an audio clip, or any other suitable media relating to the different content recommendation.

In various embodiments, the method may include sending, by the computer device in response to determining that an aggregate affirmative choice for the particular content recommendation has been achieved, a link to media corresponding to the particular content recommendation to the plurality of user devices. In some embodiments, the method may include performing, by the computer system, a comparison of a number of affirmative user decisions from the plurality of users for the particular content recommendation to a threshold value and determining the aggregate affirmative choice for the particular content recommendation using a result of the comparison.

The method concludes in block 1507. It is noted that the embodiment of the method depicted in the flow diagram of FIG. 15 can, in various embodiments, be used in conjunction with any of the methods depicted in FIGS. 13, 14, and 16.

Turning to FIG. 16, a flow diagram depicting an embodiment of a method for operating a cultivation engine is illustrated. The method, which may be applied to various cultivation engines, e.g., cultivation engine 1200 as depicted in FIG. 12, begins in block 1601.

The method includes receiving, by a computer system, a user decision regarding a particular content recommendation (block 1602). In various embodiments, the user decision may correspond to any of user decisions 105A-105C, or decisions 409 or 410. In various embodiments, data indicative of the user decision may be encrypted. In such cases, the method may additionally include decrypting, by the computer system, data indicative of the user decision.

The method also includes checking, by the computer system in response to determining the user decision is an affirmative response to the particular content recommendation, for similar content in a content database to determine a first possible content recommendation (block 1603). In various embodiments, checking for similar content may include converting at least a portion of the particular content recommendation to a vector, e.g., executing a word2vec operation, for comparison. The method may additionally include comparing the vector to vector representations of the content included in the content database using a Siamese neural network, a Jaccard algorithm, or any other suitable technique for comparing objects.

The method further includes predicting, by the computer system using the user decision, a second possible content recommendation (block 1604). In various embodiments, the computer system may predict the second possible content recommendation using a history of user decisions associated with the user that generated the user decision. In some embodiments, predicting the second possible content recommendation may include performing a singular value decomposition (SVD), a k-nearest neighbor (KNN) prediction, a non-negative matrix factorization (NFM), or any other suitable predictive algorithm. In various embodiments, any of the predictive algorithms may be trained on content included in the content database.

The method also includes selecting, by the computer system from the content database, a third possible content recommendation using a weight-based selection system (block 1605). In various embodiments, selecting the third possible content recommendation may include performing neural collaborative filtering. Alternatively, or additionally, the selection may be performed using a recurrent neural network (RNN) trained on the content in the content database and/or the history of user decisions. In some embodiments, selecting the third possible content recommendation may be performed using a graph neural network (GNN), or other suitable neural network or machine-learning technique.

The method further includes determining, by the computer system, a next content recommendation using at least one of the first possible content recommendation, the second possible content recommendation, or the third possible content recommendation (block 1606). In various embodiments, determining the next content recommendation may be based on an operation mode of the cultivation engine. In some cases, different operation modes may correspond to the different techniques described above for determining the possible content recommendations. In other embodiments, the possible content recommendations may be used in sequence, or in a random order, as the next content recommendations.

The method concludes in block 1607. It is noted that the embodiment of the method depicted in the flow diagram of FIG. 16 can, in various embodiments, be used in conjunction with any of the methods depicted in FIGS. 13-15.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

"A", "an", and "the", as used herein, refers to both singular and plural referents unless the context clearly dictates otherwise. By way of example, "a processor" programmed to perform various functions refers to one processor programmed to perform each and every function, or more than one processor collectively programmed to perform each of the various functions.

Numerous variations and modifications will become apparent to those skilled in the art once the above disclosure is fully appreciated. It is intended that the following claims be interpreted to embrace all such variations and modifications.

What is claimed is:

1. A method, comprising:

receiving, by a computer system, an activation of group mode from a first user device associated with a first user included in a group that includes a plurality of users;

sending, by the computer system, a first content recommendation to a respective plurality of user devices associated with the plurality of users;

receiving, by the computer system from the respective plurality of user devices, first data indicative of a user decision from the first user regarding the first content recommendation;

selecting, by the computer system based on a type of content in which the first content recommendation is included, a combination of at least two analysis algorithms: collaborative filtering, content-based filtering, supervised learning, deep learning, reinforcement learning, A/B testing, natural language processing, or Bayesian ranking;

determining, by the computer system, a second content recommendation using the respective plurality of user devices associated with the plurality of users;

sending, by the computer system, the second content recommendation to the respective plurality of user devices;

comparing a number of affirmative decisions received from the plurality of users for the first content recommendation to a threshold value, wherein the threshold value is associated with a type of group identified in the activation of the group mode; and in response to the number of affirmative decisions exceeding the threshold value, halting a determination of new content recommendations to the type of group identified in the activation of the group mode.

2. The method of claim 1, wherein the activation of the group mode is associated with a friend group of the first user, wherein the plurality of users is included within the friend group of the first user, and wherein user decisions of the plurality of users in the friend group are stored in a group information data store in the computer system.

3. The method of claim 1, wherein the activation of the group mode is associated with a family group of the first user, wherein the plurality of users is included within the family group of the first user, and wherein user decisions of the plurality of users in the family group are stored in a group information data store in the computer system.

4. The method of claim 1, further comprising:

determining a first threshold value for a first group in a first type of group identified in the activation of the group mode and a second threshold value for a second group in a second type of group identified in the activation of the group mode; and in response to receiving a number of affirmative decisions to the first content recommendation for the first threshold value and not the second threshold value, halting a determination of new content recommendations to the second group and sending a link to a piece of content associated with the first group.

5. The method of claim 1, wherein the first data indicative of the user decision includes information regarding a gesture made on a touchscreen included in the first user device.

6. The method of claim 5, wherein the gesture includes a swipe across the touchscreen in a particular direction.

7. The method of claim 1, wherein the first content recommendation is associated with a first content category, and further comprising:

receiving, by the computer system, a content category switch request to a second content category; and sending, by the computer system, a third content recommendation to the first user device, wherein the third content recommendation is associated with the second content category.

8. A system, comprising:

one or more memory circuits configured to store instructions; and one or more processors configured to receive instructions from the one or more memory circuits and execute the instructions to cause the system to perform operations comprising:

receiving, by a computer system, an activation of group mode from a first user device associated with a first user included in a group that includes a plurality of users;

sending, by the computer system, a first content recommendation to a respective plurality of user devices associated with the plurality of users;

receiving, by the computer system from the respective plurality of user devices, first data indicative of a user decision from the first user regarding the first content recommendation;

selecting, by the computer system based on a type of content in which the first content recommendation is included, a combination of at least two analysis algorithms: collaborative filtering, content-based filtering, supervised learning, deep learning, reinforcement learning, A/B testing, natural language processing, or Bayesian ranking;

determining, by the computer system, a second content recommendation using the respective plurality of user devices associated with the plurality of users;

sending, by the computer system, the second content recommendation to the respective plurality of user devices;

comparing a number of affirmative decisions received from the plurality of users for the first content recommendation to a first threshold value, wherein the first threshold value is associated with a type of group identified in the activation of the group mode; and in response to the number of affirmative decisions exceeding the first threshold value, halting a determination of new content recommendations to the type of group identified in the activation of the group mode.

9. The system of claim 8, wherein the activation of the group mode is associated with a friend group of the first user, wherein the plurality of users is included within the friend group of the first user, and wherein user decisions of the plurality of users in the friend group are stored in a group information data store in the computer system.

10. The system of claim 8, wherein the activation of the group mode is associated with a family group of the first user, wherein the plurality of users is included within the family group of the first user, and wherein user decisions of the plurality of users in the family group are stored in a group information data store in the computer system.

11. The system of claim 8, wherein the operations further include:

comparing a number of affirmative decisions received from the plurality of users for the first content recommendation to a second threshold value, wherein the second threshold value is associated with a type of group identified in the activation of the group mode; and in response to the number of affirmative decisions exceeding the second threshold value, halting a determination of new content recommendations to the type of group identified in the activation of the group mode.

12. The system of claim 8, wherein the first data indicative of the user decision includes information regarding a gesture made on a touchscreen included in the first user device.

13. The system of claim 12, wherein the gesture includes a swipe across the touchscreen in a particular direction.

14. The system of claim 8, wherein the first content recommendation is associated with a first content category, and the operations further include:

receiving, by the computer system, a content category switch request to a second content category; and sending, by the computer system, a third content recommendation to the first user device, wherein the third content recommendation is associated with the second content category.

15. A non-transitory computer-accessible storage medium having program instructions stored therein that, in response to execution by a computer system, causes the computer system to perform operations including:

receiving, by the computer system, an activation of group mode from a first user device associated with a first user included in a group that includes a plurality of users;

sending, by the computer system, a first content recommendation to a respective plurality of user devices associated with the plurality of users;

receiving, by the computer system from the respective plurality of user devices, first data indicative of a user decision from the first user regarding the first content recommendation;

selecting, by the computer system based on a type of content in which the first content recommendation is included, a combination of at least two analysis algorithms: collaborative filtering, content-based filtering, supervised learning, deep learning, reinforcement learning, A/B testing, natural language processing, or Bayesian ranking;

determining, by the computer system, a second content recommendation using the respective plurality of user devices associated with the plurality of users;

sending, by the computer system, the second content recommendation to the respective plurality of user devices;

comparing a number of affirmative decisions received from the plurality of users for the first content recommendation to a threshold value, wherein the threshold value is associated with a type of group identified in the activation of the group mode; and in response to the number of affirmative decisions exceeding the threshold value, halting a determination of new content recommendations to the type of group identified in the activation of the group mode.

16. The non-transitory computer-accessible storage medium of claim 15, wherein the activation of the group mode is associated with a friend group of the first user, wherein the plurality of users is included within the friend group of the first user, and wherein user decisions of the plurality of users in the friend group are stored in a group information data store in the computer system.

17. The non-transitory computer-accessible storage medium of claim 15, wherein the activation of the group mode is associated with a family group of the first user, wherein the plurality of users is included within the family group of the first user, and wherein user decisions of the plurality of users in the family group are stored in a group information data store in the computer system.

* * * * *